(12) United States Patent
Ishida et al.

(10) Patent No.: US 12,282,156 B2
(45) Date of Patent: Apr. 22, 2025

(54) LIGHT CONTROL SYSTEM AND OPTICAL REFLECTION ELEMENT

(71) Applicant: Panasonic Intellectual Property Management Co., Ltd., Osaka (JP)

(72) Inventors: Takami Ishida, Osaka (JP); Kazuki Komaki, Osaka (JP); Ryouichi Takayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 471 days.

(21) Appl. No.: 17/660,843

(22) Filed: Apr. 27, 2022

(65) Prior Publication Data

US 2022/0252869 A1    Aug. 11, 2022

Related U.S. Application Data

(63) Continuation of application No. PCT/JP2020/040603, filed on Oct. 29, 2020.

(30) Foreign Application Priority Data

Nov. 27, 2019    (JP) .................................. 2019-214458

(51) Int. Cl.
*G02B 26/10* (2006.01)
*G02B 26/12* (2006.01)

(52) U.S. Cl.
CPC ......... *G02B 26/105* (2013.01); *G02B 26/121* (2013.01)

(58) Field of Classification Search
None
See application file for complete search history.

(56) References Cited

U.S. PATENT DOCUMENTS 5,969,465 A * 10/1999 Neukermans ......... B81B 3/0078
                                                           310/40 MM
2007/0268544 A1    11/2007 Ueyama
(Continued)

FOREIGN PATENT DOCUMENTS

CN    208872943 U    5/2019
JP    2007-310196    11/2007
(Continued)

OTHER PUBLICATIONS

English Translation of Chinese Office Action dated Feb. 24, 2024 for the related Chinese Patent Application No. 202080079441.9.
(Continued)

*Primary Examiner* — Robert E. Tallman
(74) *Attorney, Agent, or Firm* — Rimon P.C.

(57) ABSTRACT

A light control system includes an optical reflection element and a controller. The optical reflection element includes: a reflector; and a first swing portion and a second swing portion disposed at respective one of positions sandwiching the reflector. Each of the first swing portion and the second swing portion includes: a first connection portion coupled to the reflector; a first vibration portion; a second vibration portion; a first drive portion; a second drive portion; and a second connection portion that connects the first and second vibration portions to a base. The controller causes the first and second drive portions of the first swing portion to vibrate in the same phase, and causes the first and second drive portions of the second swing portion to vibrate in the same phase but in the opposite phase to the first swing portion.

10 Claims, 10 Drawing Sheets

(56) References Cited

U.S. PATENT DOCUMENTS

| | | | | |
|---|---|---|---|---|
| 2010/0296147 | A1* | 11/2010 | Terada | H04N 1/113 |
| | | | | 359/224.1 |
| 2014/0226194 | A1* | 8/2014 | Mihara | G02B 26/105 |
| | | | | 359/198.1 |
| 2015/0203346 | A1* | 7/2015 | Fujimoto | B81B 3/0072 |
| | | | | 74/1 SS |
| 2021/0173201 | A1* | 6/2021 | Ishida | G02B 26/0858 |

FOREIGN PATENT DOCUMENTS

| | | |
|---|---|---|
| JP | 2009-244602 | 10/2009 |
| JP | 5045470 B | 10/2012 |
| JP | 2019-082625 | 5/2019 |

OTHER PUBLICATIONS

International Search Report of PCT application No. PCT/JP2020/040603 dated Jan. 19, 2021.

* cited by examiner

DRIVE SIGNAL WAVEFORM

LIGHT CONTROL SYSTEM AND OPTICAL REFLECTION ELEMENT

BACKGROUND

1. Technical Field

The present disclosure relates to a light control system and an optical reflection element.

2. Description of the Related Art

A conventional optical reflection element that sweeps laser light includes a reflector, connection portions, a vibration portion, and a drive portion as disclosed in, for example, Unexamined Japanese Patent Publication No. 2009-244602. The reflector reflects laser light and the like. The connection portions are connected to the reflector and twist themselves to rotationally swing the reflector. The number of the vibration portions is two, and each vibration portion has an arm shape and extends in a direction intersecting a rotational axis of the reflector to cause the connection portion to reciprocally twist. The drive portion includes piezoelectric elements or the like that vibrate respective ones of the two vibration portions. In the above-described optical reflection element, the reflector rotates only in the twist direction of the connection portion.

CITATION LIST

Patent Literature

PTL 1: Unexamined Japanese Patent Publication No. 2009-244602

SUMMARY

An object of the present disclosure is to improve performance of an optical reflection element.

A light control system according to one aspect of the present disclosure includes an optical reflection element and a controller. The optical reflection element reflects and reciprocally moves light. The controller controls the optical reflection element. The optical reflection element includes a first axis, a base, a reflector, a first swing portion, and a second swing portion. The reflector reflects light. The first swing portion and the second swing portion are each disposed at a position along the first axis. Each of the first swing portion and the second swing portion is disposed at a respective one of positions that sandwich the reflector. The first swing portion and the second swing portion both swing the reflector. Each of the first swing portion and the second swing portion includes a first connection portion, a first vibration portion, a second vibration portion, a first drive portion, a second drive portion, and a second connection portion. The first connection portions are disposed along the first axis. A tip end of each of the first connection portions is coupled to the reflector. Each of the first vibration portions extends in a direction intersecting the first axis. Each of the first vibration portions is coupled to a base end of a respective one of the first connection portions. Each of the second vibration portions extends in a direction intersecting the first axis and on an opposite side of a respective one of the first vibration portions with respect to the first axis. Each of the second vibration portions is coupled to a base end of a respective one of the first connection portions. Each of the first drive portions extends along the first axis. A base end of each of the first drive portions is coupled to a tip end of a respective one of the first vibration portions. Each of the first drive portions causes a corresponding one of the first connection portions to operate via a corresponding one of the first vibration portions. Each of the second drive portions extends along the first axis. A base end of each of the second drive portions is coupled to a tip end of a respective one of the second vibration portions. Each of the second drive portions causes a corresponding one of the first connection portions to operate via a corresponding one of the second vibration portions. Each of the second connection portions connects a corresponding one of the first vibration portions and a corresponding one of the second vibration portions to the base in a vibratory manner. The controller causes the first drive portion and the second drive portion of the first swing portion to vibrate in the same phase. The controller causes the first drive portion and the second drive portion of the second swing portion to vibrate in the same phase. The controller causes the second swing portion and the first swing portion to vibrate in mutually opposite phases.

An optical reflection element according to another aspect of the present disclosure includes a first axis, a second axis, a base, a reflector, a first swing portion, a second swing portion, a third swing portion, and a fourth swing portion. The second axis intersects the first axis. The reflector reflects light. The first swing portion and the second swing portion are each disposed at a position along the first axis. Each of the first swing portion and the second swing portion is disposed at a respective one of positions that sandwich the reflector. The first swing portion and the second swing portion both swing the reflector. The third swing portion and the fourth swing portion are each disposed at a position along the second axis. Each of the third swing portion and the fourth swing portion is disposed at a respective one of positions that sandwich the reflector. The third swing portion and the fourth swing portion both swing the reflector. Each of the first swing portion and the second swing portion includes a first connection portion, a first vibration portion, a second vibration portion, a first drive portion, a second drive portion, and a second connection portion. The first connection portions are disposed along the first axis. A tip end of each of the first connection portions is coupled to the reflector. The first connection portions extend along the first axis. Each of the first vibration portions is coupled to a base end of a respective one of the first connection portions. Each of the second vibration portions extends in a direction intersecting the first axis and on an opposite side of a respective one of the first vibration portions with respect to the first axis. Each of the second vibration portions is coupled to a base end of a respective one of the first connection portions. Each of the first drive portions extends along the first axis. A base end of each of the first drive portions is coupled to a tip end of a respective one of the first vibration portions. Each of the first drive portions causes a corresponding one of the first connection portions to operate via a corresponding one of the first vibration portions. Each of the second drive portions extends along the first axis. A base end of each of the second drive portions is coupled to a tip end of a respective one of the second vibration portions. Each of the second drive portions causes a corresponding one of the first connection portions to operate via a corresponding one of the second vibration portions. Each of the second connection portions connects a corresponding one of the first vibration portions and a corresponding one of the second vibration portions to the base in a vibratory manner. Each of the third swing portion and the fourth swing portion includes a third connection portion, a third vibration portion, a fourth vibration portion, a third drive portion, a fourth drive portion, and a fourth connection portion. The third connection portions are disposed along the second axis. A tip end of each of the third connection portions is coupled to the reflector. Each of the third vibration portions extends in a direction intersecting the second axis. Each of the third vibration portions is coupled to a base end of a respective one of the third connection portions. Each of the fourth vibration portions extends in a direction intersecting the second axis and on an opposite side of a respective one of the third vibration portions with respect to the second axis. Each of the fourth vibration portions is coupled to a base end of a respective one of the third connection portions. Each of the third drive portions extends along the second axis. A base end of each of the third drive portions is coupled to a tip end of a respective one of the third vibration portions. Each of the third drive portions causes a corresponding one of the third connection portions to operate via a corresponding one of the third vibration portions. Each of the fourth drive portions extends along the second axis. A base end of each of the fourth drive portions is coupled to a tip end of a respective one of the fourth vibration portions. Each of the fourth drive portions causes a corresponding one of the third connection portions to operate via a corresponding one of the fourth vibration portions. Each of the fourth connection portions connects a corresponding one of the third vibration portions and a corresponding one of the fourth vibration portions to the base in a vibratory manner.

The techniques of the present disclosure improve performance of an optical reflection element.

DETAILED DESCRIPTIONS

Next, there will be described a light control system and an optical reflection element according to the present disclosure with reference to the drawings. The exemplary embodiments to be described below provide comprehensive or specific examples of the present disclosure. Numerical values, shapes, materials, constituent elements, arrangement positions and connection modes of the constituent elements, steps, order of the steps, and the like, illustrated in the following exemplary embodiments are merely examples, and therefore are not intended to limit the techniques according to the present disclosure. Of the constituent elements in the following exemplary embodiments, the constituent components that are not recited in the independent claims representing the most superordinate concept are illustrated herein as optional constituent elements.

The drawings are schematic views in which emphasis, omissions, and ratio adjustment are appropriately performed in order to illustrate the present disclosure, and may differ from actual shapes, positional relationships, and ratios.

In the following description and the drawings, the thickness direction of the optical reflection element is defined as a Z-axis direction. The direction parallel to a first axis of the optical reflection element is defined as a Y-axis direction. The direction parallel to a second axis of the optical reflection element is defined as an X-axis direction. The X-axis direction, the Y-axis direction, and the Z-axis direction are directions intersecting (orthogonal, in the following exemplary embodiments) each other. Furthermore, strictly speaking, expressions indicating relative directions or orientations such as parallel and orthogonal may not indicate such directions or orientations. For example, the term "two directions are parallel to each other" means not only that the two directions are perfectly parallel to each other but also that the two directions are substantially parallel to each other, in other words, the term may mean that about several percent of difference is included.

First Exemplary Embodiment (Optical Reflection Element)

Figure 1A:
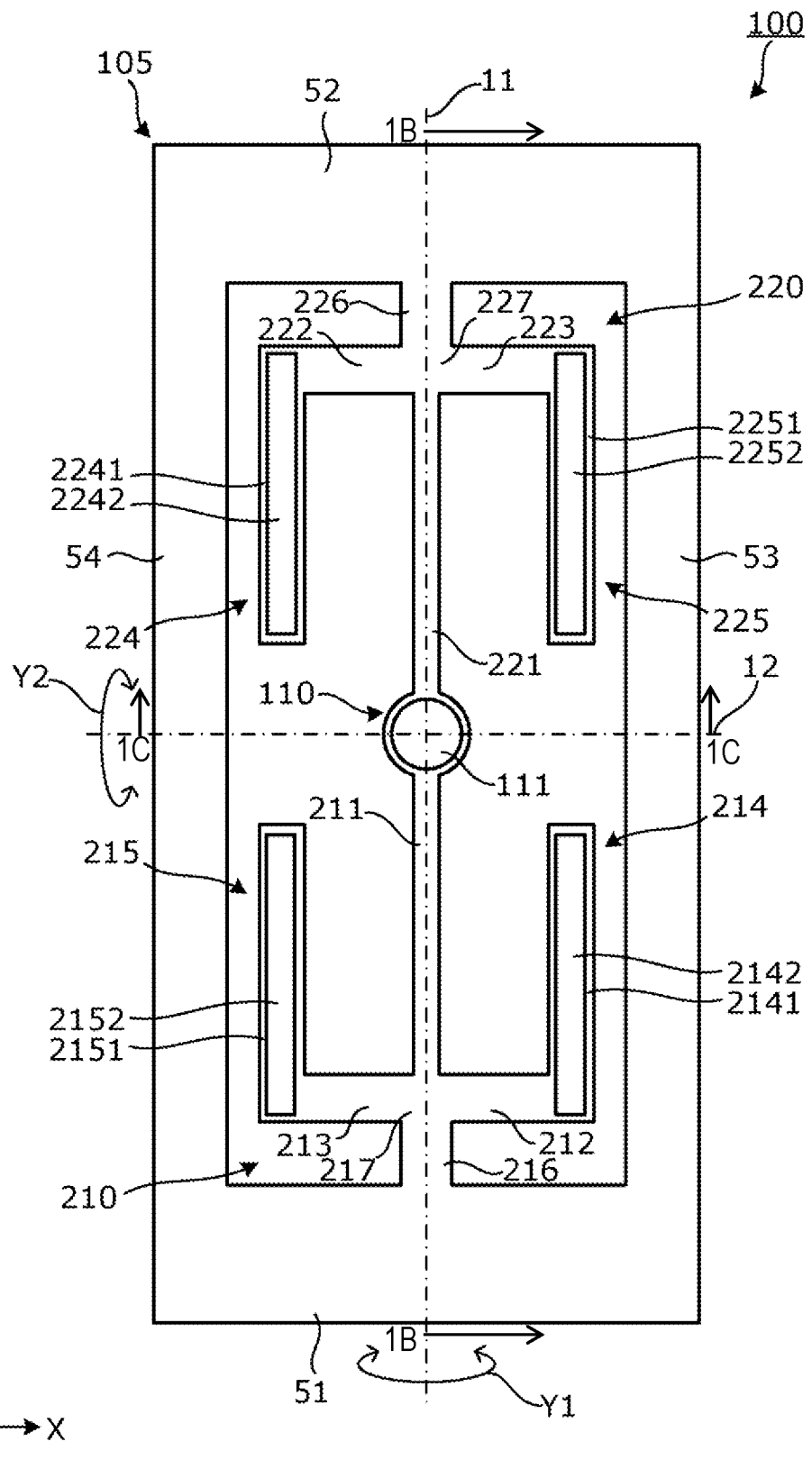
FIG. 1A is a plan view of an optical reflection element according to a first exemplary embodiment.
Figure 1B:
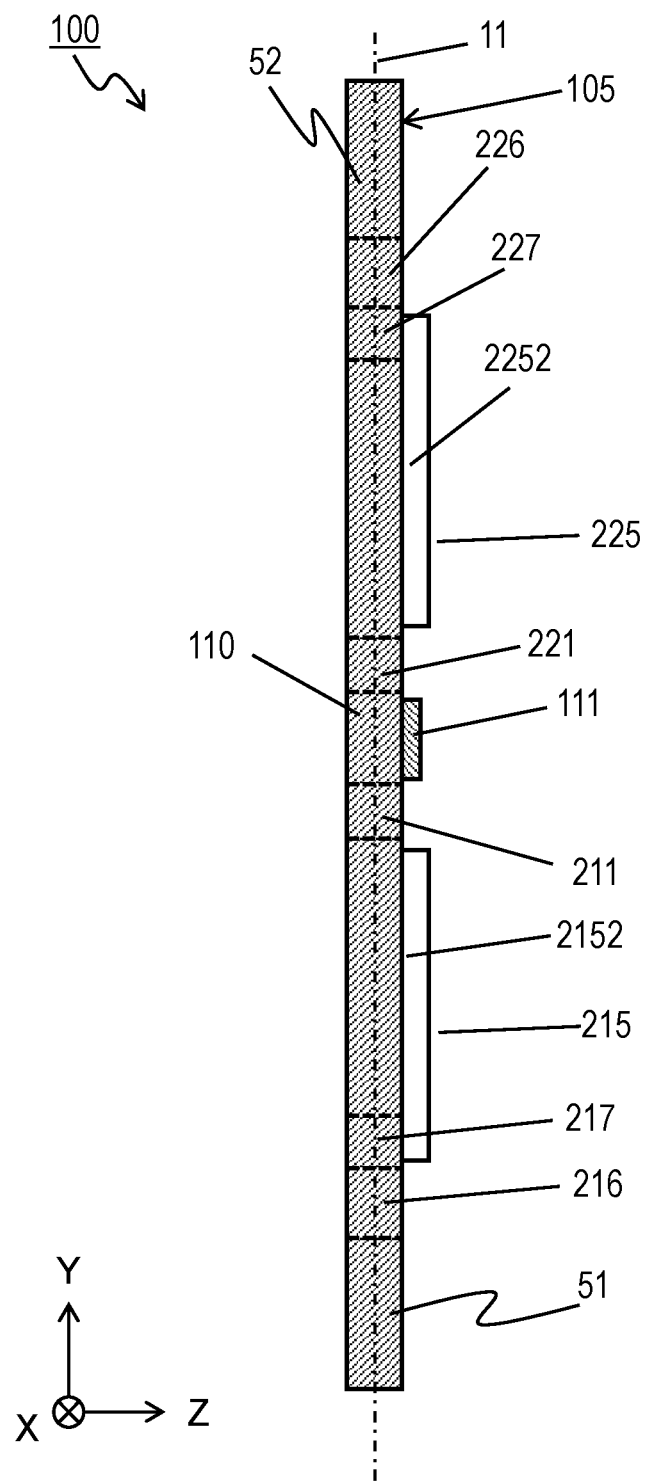
FIG. 1B is a cross-sectional view illustrating a cross-section of the optical reflection element taken along line 1B-1B in FIG. 1A.
Figure 1C:
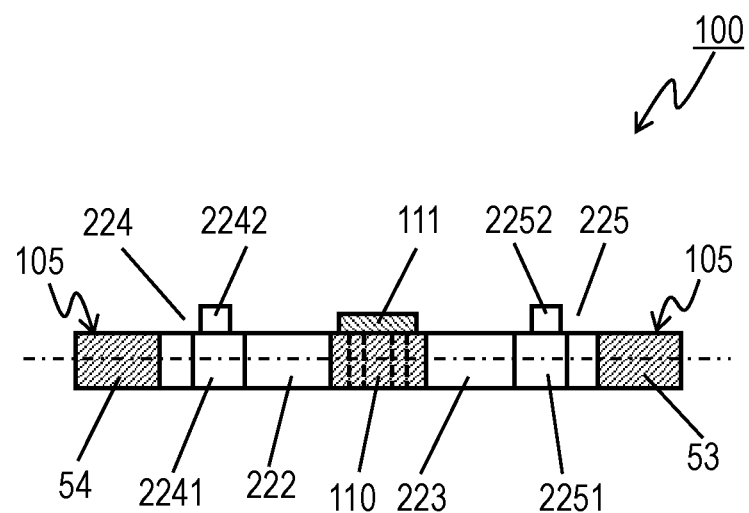
FIG. 1C is a cross-sectional view illustrating a cross-section of the optical reflection element taken along 1C-1C in FIG. 1A.

First, optical reflection element 100 according to the present disclosure will be described. FIG. 1A is a plan view illustrating optical reflection element 100 according to a first exemplary embodiment. FIG. 1B is a cross-sectional view illustrating a cross-section of optical reflection element 100 illustrated in FIG. 1A taken along line 1B-1B. FIG. 1C is a cross-sectional view illustrating a cross-section of optical reflection element 100 illustrated in FIG. 1A taking along line 1C-1C.

Optical reflection element 100 is a device that periodically changes a reflection angle of light such as laser light to periodically sweep an irradiation position of the light. As illustrated in FIG. 1A, optical reflection element 100 includes base 105 having a rectangular frame shape, reflector 110, first swing portion 210, and second swing portion 220. First swing portion 210 and second swing portion 220 are provided inside base 105 to swing reflector 110. In the present exemplary embodiment, part of reflector 110, part of first swing portion 210, part of second swing portion 220, and base 105 are integrally formed by removing unnecessary part from a single substrate. Specifically, for example, unnecessary part of a silicon substrate is removed by using an etching technique used in a semiconductor manufacturing process, so that part of reflector 110, part of first swing portion 210, part of second swing portion 220, and base 105 are integrally formed. Optical reflection element 100 is so-called micro electro mechanical systems (MEMS).

Here, the material constituting the substrate is not particularly limited but is preferably a material having mechanical strength and high Young's modulus, such as a metal, a crystalline body, glass, or plastic. Specifically, examples include metals and alloys such as silicon, titanium, stainless steel, elinvar, and brass alloy. By using these metals, alloys, or the like, it is possible to realize optical reflection element 100 having excellent vibration characteristics and workability.

Reflector 110 is a portion that reflects light by swinging. The shape of reflector 110 is not particularly limited, but in the case of the present exemplary embodiment, reflector 110 has a circular plate shape and includes, on its surface, reflection portion 111 capable of reflecting reflection target light with high reflectance. The material of reflection portion 111 can be arbitrarily selected, and examples thereof include metals such as gold, silver, copper, and aluminum and metal compounds. Furthermore, reflection portion 111 may be configured with a plurality of layers. Further, reflection portion 111 may be formed by smoothly polishing the surface of reflector 110. Reflection portion 111 may have not only a flat surface but also a curved surface. First axis 11 and second axis 12 are orthogonal to each other and central axes passing through the center of reflector 110.

Each of first swing portion 210 and second swing portion 220 is disposed at a respective one of positions sandwiching reflector 110 along the first axis. Specifically, first swing portion 210 is disposed in the negative direction of the Y-axis with respect to reflector 110, and second swing portion 220 is disposed in the positive direction of the Y-axis with respect to reflector 110.

First swing portion 210 and second swing portion 220 have basically the same configuration and are disposed to be in point symmetry with respect to the center point of optical reflection element 100. Therefore, a specific configuration of first swing portion 210 will be described in detail, but a specific structure of second swing portion 220 will be briefly described.

First swing portion 210 includes first connection portion 211, first vibration portion 212, second vibration portion 213, first drive portion 214, second drive portion 215, and second connection portion 216.

Figure 4A:
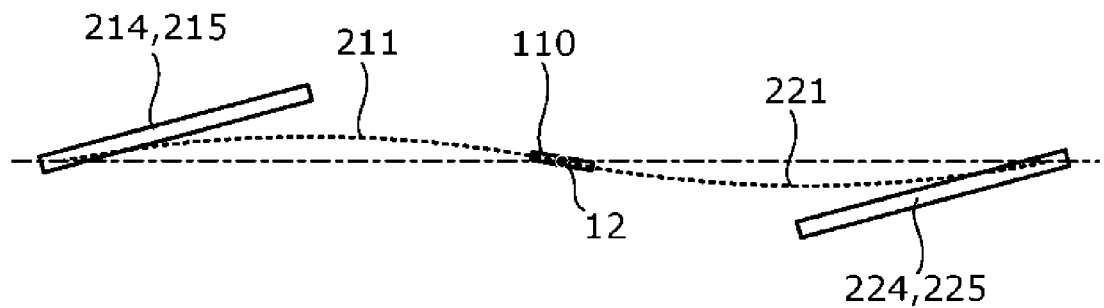
FIG. 4A is a schematic diagram illustrating how each portion of the optical reflection element according to the first exemplary embodiment operate in a second mode.
Figure 4B:
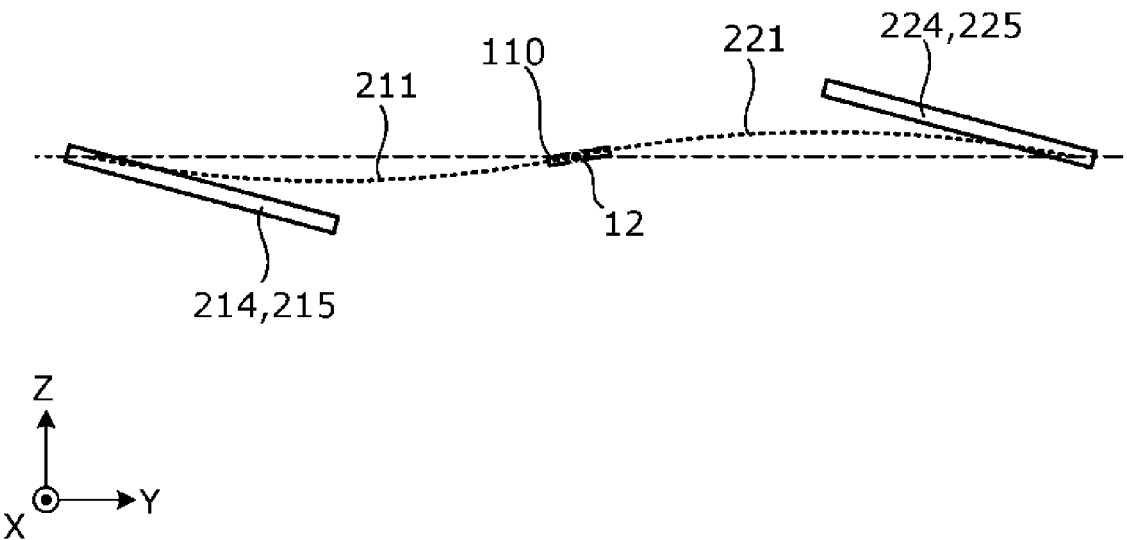
FIG. 4B is a schematic diagram illustrating how each portion of the optical reflection element according to the first exemplary embodiment operates in a second mode.

First connection portion 211 is a long rod-shaped portion extending along first axis 11. Reflector 110 is coupled to a tip end of first connection portion 211. A base end of first vibration portion 212 and a base end of second vibration portion 213 are coupled to a base end of first connection portion 211. First connection portion 211 is a portion for transmitting power to reflector 110 held by its tip end. Specifically, when first connection portion 211 is twisted about first axis 11, a rotational swing about first axis 11 is transmitted to reflector 110. On the other hand, when first connection portion 211 vibrates in the positive direction and the negative direction of the Z-axis, second connection portion 212 vibrates in the negative direction and the positive direction of the Z-axis as illustrated in FIGS. 4A and 4B. As a result, a rotational swing about second axis 12 is transmitted to reflector 110.

The shape of first connection portion 211 is not particularly limited, but since first connection portion 211 rotationally swings reflector 110 by twisting itself, first connection portion 211 is configured in a thin rod shape having a width (length in the X-axis direction in the diagram) narrower than that of reflector 110.

The expression "along first axis 11" does not mean only the case where first connection portion 211 extends straight along first axis 11 as described in the present exemplary embodiment. Even if first connection portion 211 is curved in a meandering manner or bent in a zig-zag manner, the expression "along first axis 11" is considered to include such cases as long as first connection portion 211 is imaginary straight along first axis 11.

In addition, in the present specification and the claims, the term "intersection" is used to include not only an intersection where two lines are in contact with each other but also a grade-separated intersection where two lines are not in contact with each other.

A vibration portion including first vibration portion 212 and second vibration portion 213 is a portion extending in the X-axis direction, and is an arm-shaped portion that vibrates itself to cause reflector 110 to operate. Specifically, first vibration portion 212 and second vibration portion 213 vibrate in the circumferential direction about first axis 11 to generate torque for rotationally swinging reflector 110 about first axis 11. First vibration portion 212 and second vibration portion 213 further vibrate in the Z-axis direction to generate torque for rotationally swinging reflector 110 about second axis 12.

First vibration portion 212 is disposed in a direction intersecting first axis 11 and is coupled to the base end of first connection portion 211. Second vibration portion 213 is disposed on the opposite side of first vibration portion 212 with respect to first axis 11 in the direction intersecting first axis 11, and is coupled to the base end of first connection portion 211.

In the present exemplary embodiment, first vibration portion 212 is a rectangular rod-shaped member extending in the X-axis direction, and second vibration portion 213 is a rectangular rod-shaped member extending in the direction opposite to first vibration portion 212 in the X-axis direction. The base end of first vibration portion 212 and the base end of second vibration portion 213 are integrally coupled to each other by coupling portion 217. With this arrangement, first vibration portion 212 and second vibration portion 213 have a straight rod shape extending in a direction orthogonal to first axis 11 with first axis 11 as the center.

A drive portion including first drive portion 214 and second drive portion 215 is a member that generates a driving force for vibrating the vibration portion. First drive portion 214 is coupled to a tip end of first vibration portion 212. First drive portion 214 is a member that vibrates first vibration portion 212. Second drive portion 215 is coupled to a tip end of second vibration portion 213. Second drive portion 215 is a member that vibrates second vibration portion 213.

First drive portion 214 includes first drive main portion 2141 and first piezoelectric element 2142. A base end of first drive main portion 2141 is integrally coupled to a tip end of first vibration portion 212. First drive main portion 2141 is a rod-shaped body extending toward reflector 110 along first axis 11. On a surface of first drive main portion 2141, there is provided first piezoelectric element 2142.

First piezoelectric element 2142 is an elongated plate-shaped piezoelectric element disposed along first axis 11 on a surface of first drive main portion 2141. By applying a periodically varying voltage to first piezoelectric element 2142, first piezoelectric element 2142 repeatedly expands and contracts. In correspondence to the movement of first piezoelectric element 2142, first drive main portion 2141 repeats bending and unbending. In first drive main portion 2141, a tip end, which protrudes, vibrates more largely than a base end coupled to first vibration portion 212, and vibration energy of entire first drive portion 214 is transmitted to the tip end of first vibration portion 212.

Similarly to first drive portion 214, second drive portion 215 also includes second drive main portion 2151 and second piezoelectric element 2152. Second drive portion 215 is disposed in symmetry to first drive portion 214 with respect to a virtual plane including first axis 11 and being orthogonal to the surface of reflector 110. A base end of second drive portion 215 is connected to the tip end of second vibration portion 213. The operation of second drive portion 215 is the same as the operation of first drive portion 214.

In the present exemplary embodiment, the piezoelectric element is, for example, a thin-film stacking-type piezoelectric actuator. The thin-film stacking-type piezoelectric actuator is formed on a surface of a main body of the drive portion and includes a stack structure in which electrodes and piezoelectric bodies are stacked in the thickness direction. Due to this configuration, the drive portion can be made thin.

The drive portion does not have to be a device that vibrates due to distortion of a piezoelectric element. Another drive portion may include, for example, a member or a device that generates a force by interaction with a magnetic field or an electric field. The member or the device may be a member or a device that vibrates by changing at least one of the magnetic field and the electric field generated by the external device or by changing at least one of the magnetic field and the electric field generated by the member or the device itself. Examples of a material constituting the piezoelectric body include a piezoelectric material having a high piezoelectric constant such as lead zirconate titanate (PZT).

Base 105 is a member for attaching optical reflection element 100 to an external structural member or the like and has a rectangular frame shape elongated in the Y-axis direction. Specifically, base 105 has first side portion 51 and second side portion 52 each of which extends in the X-axis direction and which face each other in the Y-axis direction. Base 105 includes third side portion 53 and fourth side portion 54 each of which extends in the Y-axis direction and which face each other in the X-axis direction.

To an inner central part of first side portion 51, there is coupled second connection portion 216 that connects first vibration portion 212 and second vibration portion 213 in a vibratory manner. Second connection portion 216 is disposed along first axis 11. A base end of second connection portion 216 is coupled to first side portion 51. A tip end of second connection portion 216 is coupled to the base end of first vibration portion 212 and the base end of second vibration portion 213 via coupling portion 217.

Although the shape of second connection portion 216 is not particularly limited, second connection portion 216 is a member that allows first connection portion 211 to twist with respect to first side portion 51 by twisting itself due to the vibration of first vibration portion 212 and second vibration portion 213. Therefore, second connection portion 216 has a rod shape and has a torsional rigidity whose value is larger than a value of a torsional rigidity of first connection portion 211.

Similarly to the case of first connection portion 211, second connection portion 216 may be not only straight along first axis 11 but also curved in a meandering manner or bent in a zig-zag manner. Also in such a case, the value of the torsional rigidity of first connection portion 211 about first axis 11 is made smaller than the value of the torsional rigidity of second connection portion 216 about first axis 11. The term "torsional rigidity" used above refers to resistance to torsion when a rod is twisted, for example. The larger the value of the torsional rigidity, the more difficult it is to twist the rod. For example, the above example shows the fact that second connection portion 216 is more difficult to be twisted than first connection portion 211.

Next, a specific structure of second swing portion 220 will be described. As described above, the basic configuration of second swing portion 220 is the same as that of first swing portion 210. Second swing portion 220 is disposed to be in point symmetry to first swing portion 210 with respect to the center point of optical reflection element 100. Therefore, a correspondence relationship between portions of second swing portion 220 and their corresponding portions of first swing portion 210 will be mainly described.

Second swing portion 220 includes a first connection portion 221, first vibration portion 222, second vibration portion 223, first drive portion 224, second drive portion 225, and second connection portion 226.

First connection portion 221 is a portion corresponding to first connection portion 211 of first swing portion 210. First vibration portion 222 is a portion corresponding to first vibration portion 212 of first swing portion 210. Second vibration portion 223 is a portion corresponding to second vibration portion 213 of first swing portion 210. The positional relationship of first vibration portion 222 and second vibration portion 223 is opposite, with respect to the x-axis direction, to the positional relationship of first vibration portion 212 and second vibration portion 213 of first swing portion 210. A base end of first vibration portion 222 and a base end of second vibration portion 223 are integrally coupled to each other by coupling portion 227.

First drive portion 224 is a portion corresponding to first drive portion 214 of first swing portion 210. Second drive portion 225 is a portion corresponding to second drive portion 215 of first swing portion 210. The positional relationship of first drive portion 224 and second drive portion 225 is opposite, with respect to the x-axis direction, to the positional relationship of first drive portion 214 and second drive portion 225 of first swing portion 210. First drive portion 224 includes first drive main portion 2241 and first piezoelectric element 2242, which correspond to first drive main portion 2141 and first piezoelectric element 2142 of first drive portion 214. Second drive portion 225 includes second drive main portion 2251 and second piezoelectric element 2252, which correspond to second drive main portion 2151 and second piezoelectric element 2152 of second drive portion 215.

Second connection portion 226 is a portion corresponding to second connection portion 216 of first swing portion 210. Second connection portion 226 is disposed along first axis 11, a base end of second connection portion 226 is coupled to second side portion 52, and a tip end of second connection portion 226 is coupled to the base end of first vibration portion 222 and the base end of second vibration portion 223 via coupling portion 227.

(Light Control System)

Figure 2:
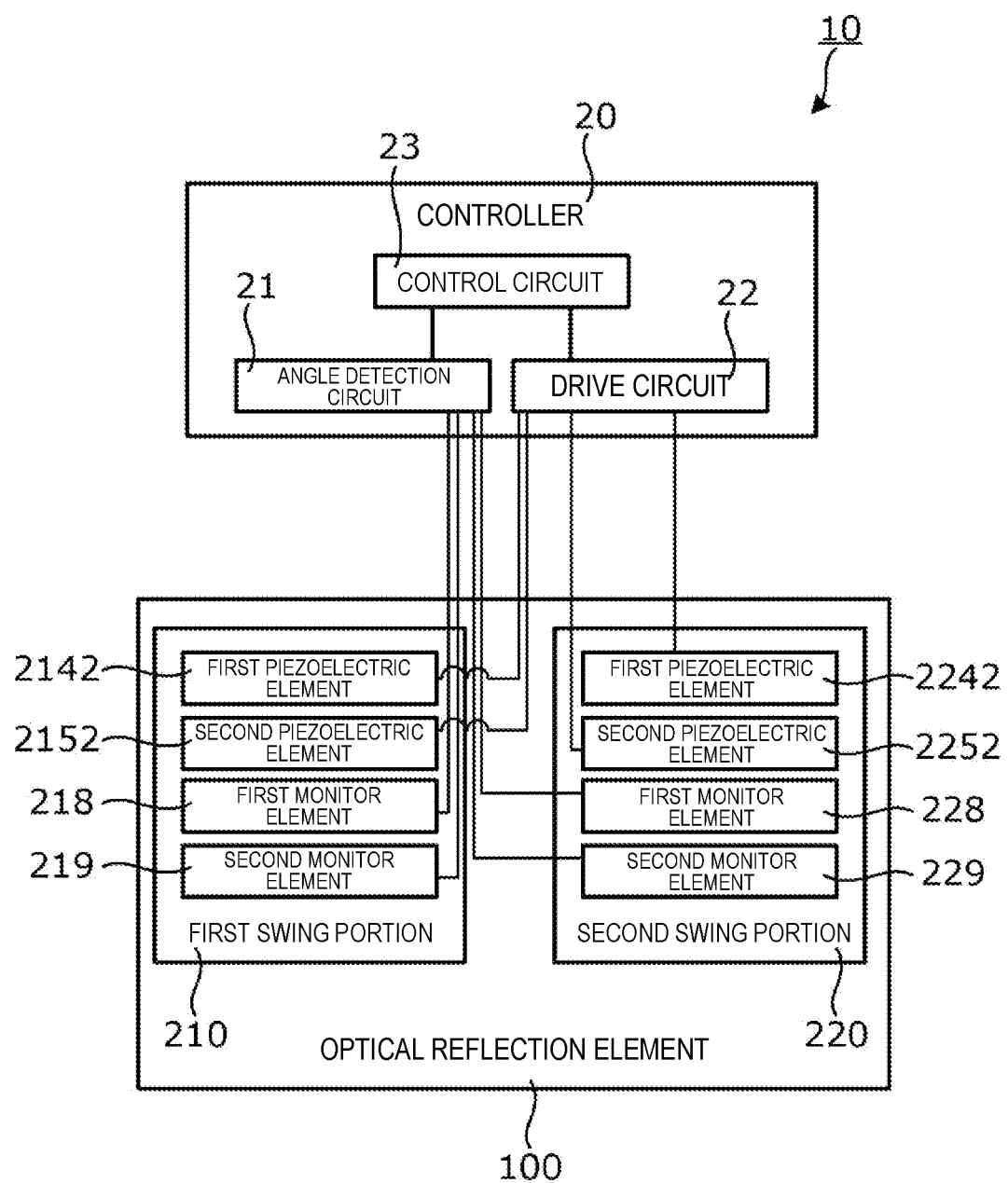
FIG. 2 is a block diagram illustrating a control configuration of a light control system according to the first exemplary embodiment.

Next, light control system 10 including optical reflection element 100 will be described. FIG. 2 is a block diagram illustrating a control configuration of light control system 10 according to the first exemplary embodiment.

As illustrated in FIG. 2, light control system 10 includes optical reflection element 100 and controller 20 that controls optical reflection element 100. A plurality of monitor elements are attached to optical reflection element 100 at appropriate positions. The monitor elements are each an element that detects, as distortion, a curved state of a corresponding vibration portion. By measuring outputs from the monitor elements, the state of the swing of reflector 110 can be accurately monitored. Specifically, first swing portion 210 is provided with: first monitor element 218 that detects distortion of first vibration portion 212; and second monitor element 219 that detects distortion of second vibration portion 213. Second swing portion 220 is provided with: first monitor element 228 that detects distortion of first vibration portion 222; and second monitor element 229 that detects distortion of second vibration portion 223.

Controller 20 includes angle detection circuit 21, drive circuit 22, and control circuit 23. Angle detection circuit 21 is a circuit that receives detection signals from the monitor elements (first monitor elements 218, 228 and second monitor elements 219, 229) to detect angle information of reflector 110 on the basis of the detection signals, and outputs the angle information to control circuit 23.

Drive circuit 22 is a circuit that outputs periodic voltages to the piezoelectric elements (first piezoelectric elements 2142, 2242 and second piezoelectric elements 2152, 2252) on the basis of a drive signal from control circuit 23.

Control circuit 23 is a circuit that adjusts the drive signal to be output to drive circuit 22 so that reflector 110 is at an arbitrary angle, on the basis of the angle information of reflector 110 input from angle detection circuit 21.

Note that the present exemplary embodiment describes, as an example, the case where angle detection circuit 21, drive circuit 22, and control circuit 23 are dedicated circuits. However, controller 20 may be executed by one or more electronic circuits including a semiconductor device, a semiconductor integrated circuit (IC), or a large scale integration (LSI). The LSI or the IC may be integrated into one chip or may be configured with a plurality of combined chips.

(Operation)

Next, the operation of optical reflection element 100 will be described. Optical reflection element 100 operates on the basis of the control of controller 20. Controller 20 can perform a first mode for rotationally swinging reflector 110 about first axis 11 and a second mode for rotationally swinging reflector 110 about second axis 12.

Figure 3:
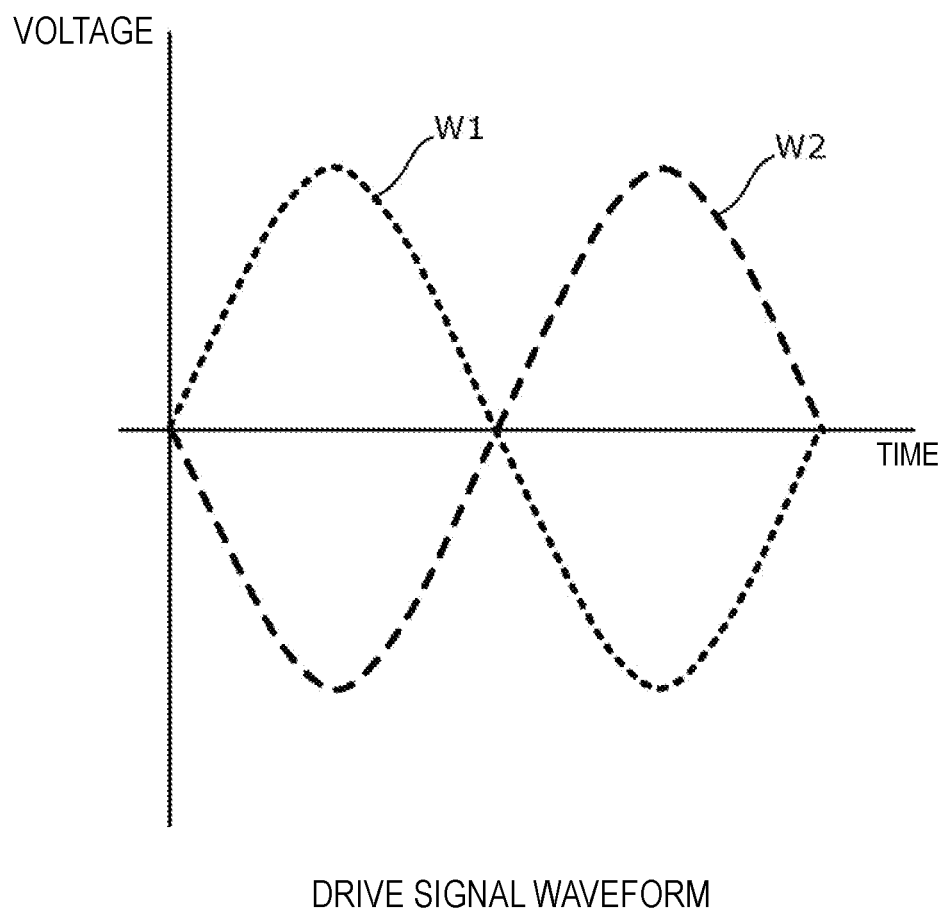
FIG. 3 is an explanatory diagram illustrating an example of drive signals for causing the optical reflection element according to the first exemplary embodiment to operate.

FIG. 3 is an explanatory diagram illustrating an example of drive signals for causing optical reflection element 100 to operate according to the first exemplary embodiment to operate. The drive signals are signals for applying AC voltages each of which periodically causes a corresponding one of the piezoelectric elements to displace. The frequency of the drive signals is a resonance frequency capable of vibrating the drive portions. In FIG. 3, as an example of the drive signals, a waveform of first drive signal W1 and a waveform of second drive signal W2 are illustrated only for one cycle. Second drive signal W2 has a waveform in the opposite phase to first drive signal W1. Controller 20 performs the first mode and the second mode by combining first drive signal W1 and second drive signal W2 supplied to the piezoelectric elements.

(First Mode)

An operation in the first mode will be described. In the first mode, for example, controller 20 applies first drive signal W1 to the pair of piezoelectric elements disposed in the positive direction of the X-axis with respect to reflector 110, and applies second drive signal W2 to the pair of piezoelectric elements disposed in the negative direction in the X-axis with respect to reflector 110. Specifically, controller 20 applies first drive signal W1 to first piezoelectric element 2142 of first swing portion 210 and second piezoelectric element 2252 of second swing portion 220, and applies second drive signal W2 to second piezoelectric element 2152 of first swing portion 210 and first piezoelectric element 2242 of second swing portion 220. As a result, in first swing portion 210, first drive portion 214 and first vibration portion 212, and second drive portion 215 and second vibration portion 213 rotationally swing in the same direction in the circumferential direction about first axis 11. On the other hand, also in second swing portion 220, similarly to first swing portion 210, first drive portion 224 and first vibration portion 222, and second drive portion 225 and second vibration portion 223 rotationally swing in the same direction in the circumferential direction about first axis 11. As a result, first connection portions 211, 221 are twisted about first axis 11, so that reflector 110 also rotationally swings about first axis 11 (see arrow Y1 in FIG. 1A).

(Second Mode)

Next, an operation in the second mode will be described. In the second mode, for example, controller 20 applies first drive signal W1 to first piezoelectric element 2142 and second piezoelectric element 2152 of first swing portion 210, and applies second drive signal W2 to first piezoelectric element 2242 and second piezoelectric element 2252 of second swing portion 220.

FIGS. 4A and 4B are schematic diagrams each illustrating how each portion of optical reflection element 100 according to the first exemplary embodiment operates in the second mode. In FIGS. 4A and 4B, first connection portions 211, 221 are depicted by broken lines. In FIGS. 4A and 4B, first drive portion 214 and second drive portion 215 of first swing portion 210, first drive portion 224 and second drive portion 225 of second swing portion 220, and reflector 110 are depicted by solid lines. In FIGS. 4A and 4B, the center line of optical reflection element 100 in the Z-axis direction is indicated by an alternate long and short dashed line.

FIG. 4A shows the following case: the tips of first drive portion 214 and second drive portion 215 of first swing portion 210 are at a point where the displacement amount is largest in the positive direction of the Z-axis, and at the same time, the tips of first drive portion 224 and second drive portion 225 of second swing portion 220 are at a point where the displacement amount is largest in the negative direction of the Z-axis. When the tips of first drive portion 214 and second drive portion 215 of first swing portion 210 are in the positive direction of the Z-axis, first connection portion 211 is curved in a convex shape toward the positive direction of the Z-axis. On the other hand, when the tips of first drive portion 224 and second drive portion 225 of second swing portion 220 are in the negative direction of the Z-axis, first connection portion 221 is curved in a convex shape toward the negative direction of the Z-axis.

FIG. 4B shows the following case: the tips of first drive portion 214 and second drive portion 215 of first swing portion 210 are at a point where the displacement amount is largest in the negative direction of the Z-axis, and at the same time, the tips of first drive portion 224 and second drive portion 225 of second swing portion 220 are at a point where the displacement amount is largest in the positive direction of the Z-axis. When the tips of first drive portion 214 and second drive portion 215 of first swing portion 210 are in the negative direction of the Z-axis, first connection portion 211 is curved in a convex shape toward the negative direction of the Z-axis. On the other hand, when the tips of first drive portion 224 and second drive portion 225 of second swing portion 220 are in the positive direction of the Z-axis, first connection portion 221 is curved in a convex shape toward the positive direction of the Z-axis.

When the second mode is performed, the state is repeatedly transitioned between the state of FIG. 4A and the state of FIG. 4B. At this time, first drive portion 214 and second drive portion 215 of first swing portion 210 vibrate in the same phase as first connection portion 211 of first swing portion 210. On the other hand, first drive portion 224 and second drive portion 225 of second swing portion 220 vibrate in the same phase as first connection portion 221 of second swing portion 220. Because first connection portions 211, 221 vibrate in a wavy manner, reflector 110 rotationally swings about second axis 12 (see arrow Y2 in FIG. 1A).

Advantageous Effects and Others

As described above, light control system 10 according to the present exemplary embodiment includes: optical reflection element 100 that reflects and reciprocally moves light; and controller 20 that controls optical reflection element 100. Optical reflection element 100 includes first axis 11, reflector 110 that reflects light, base 105, first swing portion 210, and second swing portion 220. Each of first swing portion 210 and second swing portion 220 is disposed at a respective one of positions that sandwich reflector 110 along first axis 11. Each of first swing portion 210 and second swing portion 220 swings reflector 110.

First swing portion 210 includes first connection portion 211, first vibration portion 212, second vibration portion 213, first drive portion 214, second drive portion 215, and second connection portion 216.

First connection portion 211 is disposed along first axis 11. The tip end of first connection portion 211 is coupled to reflector 110.

First vibration portion 212 extends in a direction intersecting first axis 11. First vibration portion 212 is coupled to the base end of first connection portion 211.

Second vibration portion 213 extends in a direction intersecting first axis 11 and on the opposite side of first vibration portion 212 with respect to first axis 11. Second vibration portion 213 is coupled to the base end of first connection portion 211.

First drive portion 214 extends along first axis 11. A base end of first drive portion 214 is coupled to the tip end of first vibration portion 212. First drive portion 214 causes, via first vibration portion 212, first connection portion 211 to operate.

Second drive portion 215 extends along first axis 11. The base end of second drive portion 215 is coupled to the tip end of second vibration portion 213. Second drive portion 215 causes, via second vibration portion 213, first connection portion 211 to operate.

Second connection portion 216 connects both first vibration portion 212 and second vibration portion 213 to base 105 in a vibratory manner.

Second swing portion 220 includes first connection portion 221, first vibration portion 222, second vibration portion 223, first drive portion 224, second drive portion 225, and second connection portion 226.

First connection portion 221 is disposed along first axis 11. A tip end of first connection portion 221 is coupled to reflector 110.

First vibration portion 222 extends in a direction intersecting first axis 11. First vibration portion 222 is coupled to a base end of first connection portion 221.

Second vibration portion 223 extends in a direction intersecting first axis 11 and on the opposite side of first vibration portion 222 with respect to first axis 11. Second vibration portion 223 is coupled to the base end of first connection portion 221.

First drive portion 224 extends along first axis 11. A base end of first drive portion 224 is coupled to a tip end of first vibration portion 222. First drive portion 224 causes, via first vibration portion 222, first connection portion 221 to operate.

Second drive portion 225 extends along first axis 11. A base end of second drive portion 225 is coupled to a tip end of second vibration portion 223. Second drive portion 225 causes, via second vibration portion 223, first connection portion 221 to operate.

Second connection portion 226 connects both first vibration portion 222 and second vibration portion 223 to base 105 in a vibratory manner.

Controller 20 causes first drive portion 214 and second drive portion 215 of first swing portion 210 to vibrate in the same phase, and causes first drive portion 224 and second drive portion 225 of second swing portion 220 to vibrate in the same phase but in the opposite phase to first swing portion 210.

In this operation, controller 20 causes first drive portion 214 and second drive portion 215 of first swing portion 210 to vibrate in the same phase, and at the same time, causes first drive portion 224 and second drive portion 225 of second swing portion 220 to vibrate in the same phase but in the opposite phase to first swing portion 210. As a result, it is possible to cause reflector 110 rotationally swing about second axis 12. In the conventional art, it is only possible to cause reflector 110 to rotationally swing about first axis 11 by twisting first connection portions 211, 221. On the other hand, in light control system 10 according to the present exemplary embodiment, it is possible to cause reflector 110 to rotationally swing about second axis 12 without increasing the number of piezoelectric elements. Therefore, the swing range of reflector 110 can be expanded, and the performance of optical reflection element 100 can be improved.

Second Exemplary Embodiment

Next, a second exemplary embodiment will be described. In the following description, the same portions as the portions in the above first exemplary embodiment are denoted by the same reference marks, and the description thereof may be omitted.

The second exemplary embodiment is different from the first exemplary embodiment in that controller 20 performs, in the second mode, a control method different from the control method in the first exemplary embodiment. Specifically, in the second mode, controller 20 causes first drive portion 214 and second drive portion 215 of first swing portion 210 to vibrate in the same phase so as to cause first drive portion 214 and second drive portion 215 of first swing portion 210 to vibrate in the opposite phase to first connection portion 211 of first swing portion 210. At this time, controller 20 causes first drive portion 224 and second drive portion 225 of second swing portion 220 to vibrate in the same phase so as to cause first drive portion 224 and second drive portion 225 of second swing portion 220 to vibrate in the opposite phase to first connection portion 221 of second swing portion 220.

In the second mode in the second exemplary embodiment, for example, controller 20 applies a first drive signal to first piezoelectric element 2142 and second piezoelectric element 2152 of first swing portion 210, and applies a second drive signal to first piezoelectric element 2242 and second piezoelectric element 2252 of second swing portion 220. At this time, the first drive signal and the second drive signal are in mutually opposite phases. The first drive signal and the second drive signal are drive signals having a higher frequency than first drive signal W1 and the second drive signal W2 in the first exemplary embodiment. Because the first drive signal and the second drive signal are determined depending on the material, shape, size, and the like of optical reflection element 100, the first drive signal and the second drive signal can be obtained by performing various experiments, simulations, and the like.

Figure 5A:
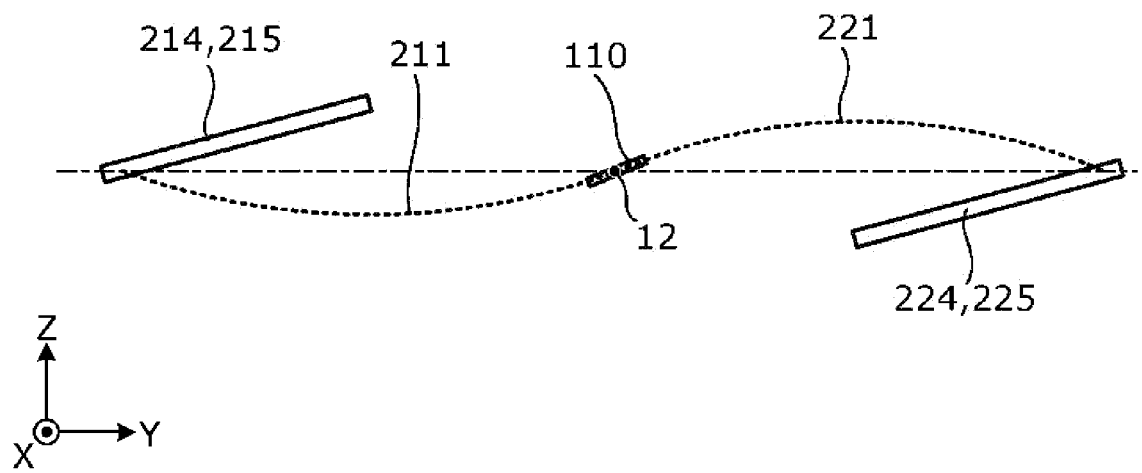
FIG. 5A is a schematic diagram illustrating how each portion of the optical reflection element according to a second exemplary embodiment operates in a second mode.
Figure 5B:
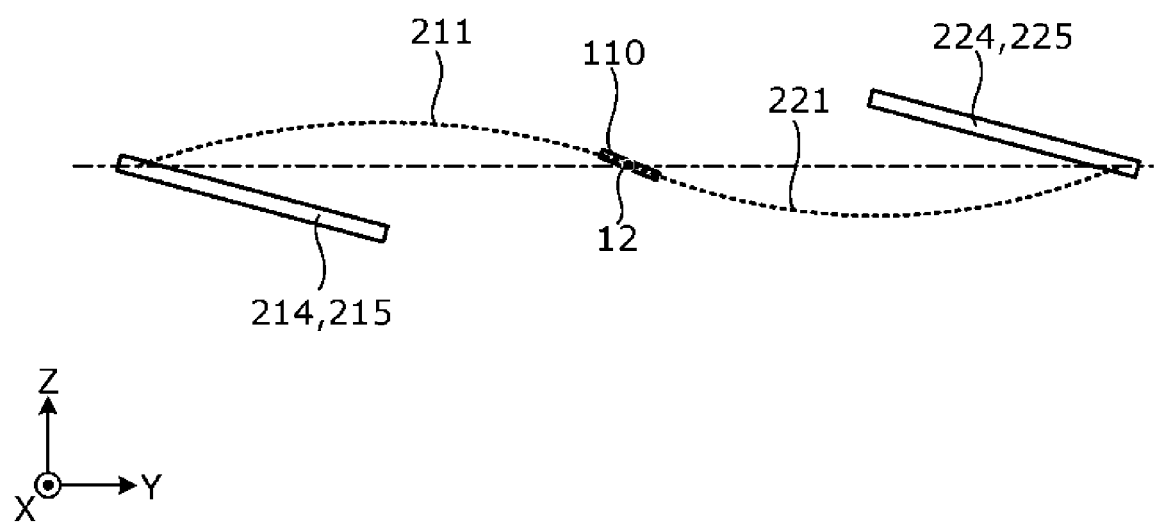
FIG. 5B is a schematic diagram illustrating how each portion of the optical reflection element according to the second exemplary embodiment operates in the second mode.

FIGS. 5A and 5B are schematic diagrams each illustrating how each portion of optical reflection element 100 according to the second exemplary embodiment operates in the second mode. In FIGS. 5A and 5B, the first connection portions 211, 221 are depicted by broken lines. In FIGS. 5A and 5B, the center line of optical reflection element 100 in the Z-axis direction is depicted by an alternate long and short dashed line.

FIG. 5A shows the following case: the tips of first drive portion 214 and second drive portion 215 of first swing portion 210 are at a point where the displacement amount is largest in the positive direction of the Z-axis, and at the same time, the tips of first drive portion 224 and second drive portion 225 of second swing portion 220 are at a point where the displacement amount is largest in the negative direction of the Z-axis. When the tips of first drive portion 214 and second drive portion 215 of first swing portion 210 are in the positive direction of the Z-axis, first connection portion 211 is curved in a convex shape toward the negative direction of the Z-axis. On the other hand, when the tips of first drive portion 224 and second drive portion 225 of second swing portion 220 are in the negative direction of the Z-axis, first connection portion 221 is curved in a convex shape toward the positive direction of the Z-axis.

FIG. 5B shows the following case: the tips of first drive portion 214 and second drive portion 215 of first swing portion 210 are at a point where the displacement amount is largest in the negative direction of the Z-axis, and at the same time, the tips of first drive portion 224 and second drive portion 225 of second swing portion 220 are at a point where the displacement amount is largest in the positive direction of the Z-axis. When the tips of first drive portion 214 and second drive portion 215 of first swing portion 210 are in the negative direction of the Z-axis, first connection portion 211 is curved in a convex shape toward the positive direction of the Z-axis. On the other hand, when the tips of first drive portion 224 and second drive portion 225 of second swing portion 220 are in the positive direction of the Z-axis, first connection portion 221 is curved in a convex shape toward the negative direction of the Z-axis.

When the second mode is performed, the state is repeatedly transitioned between the state of FIG. 5A and the state of FIG. 5B. At this time, first drive portion 214 and second drive portion 215 of first swing portion 210 vibrate in the opposite phase to first connection portion 211 of first swing portion 210. On the other hand, first drive portion 224 and second drive portion 225 of second swing portion 220 vibrate in the opposite phase to first connection portion 221 of second swing portion 220. As described above, since the displacement direction of first drive portion 214 and second drive portion 215 and the displacement direction of first drive portion 224 and second drive portions 225 are respectively opposite to the displace direction of the first connection portion 211 and the displacement direction of first connection portion 221, a vibration confinement effect is generated in each of first swing portion 210 and second swing portion 220. Therefore, a resonance sharpness (Q factor) of a resonance mode for rotating reflector 110, in other words, a Q factor of a resonance mode (drive mode) of optical reflection element 100 is increased. As the resonance sharpness (Q factor) is increased, the deflection angle characteristic of reflector 110 is increased. That is, in the second mode, it is possible to rotationally swing reflector 110 in a larger range in the second exemplary embodiment than in the first exemplary embodiment. Here, the vibration confinement effect means the following effect: when first swing portion 210 and second swing portion 220 are driven (vibrated), vibration is completed in each of the structures (vibration is not transmitted to the fixed end side of each second connection portion or the like), and vibration is not transmitted to each second connection portion or the base for fixing the swing portions. As a result, driving can be performed in an ideal resonance mode as an oscillator. Specifically, it is possible to vibrate first swing portion 210 and second swing portion 220 with a high Q factor.

Advantageous Effects and Others

As described above, with the present exemplary embodiment, controller 20 causes first drive portion 214 and second drive portion 215 of first swing portion 210 to vibrate in the same phase so as to cause first drive portion 214 and second drive portion 215 of first swing portion 210 to vibrate in the opposite phase to first connection portion 211 of first swing portion 210. At the same time, controller 20 causes first drive portion 224 and second drive portion 225 of second swing portion 220 to vibrate in the same phase so as to cause first drive portion 224 and second drive portion 225 of second swing portion 220 to vibrate in the opposite phase to first connection portion 221 of second swing portion 220.

As described above, since the displacement direction of first drive portion 214 and second drive portion 215 and the displacement direction of first drive portion 224 and second drive portions 225 are respectively opposite to the displace direction of the first connection portion 211 and the displacement direction of first connection portion 221, a vibration confinement effect can be generated in each of first swing portion 210 and second swing portion 220. Therefore, the deflection angle characteristic of reflector 110 can be improved, and as a result, the performance of optical reflection element 100 is improved.

Third Exemplary Embodiment

Next, a third exemplary embodiment will be described. In the following description, the same portions as the portions in the above first exemplary embodiment are denoted by the same reference marks, and the description thereof may be omitted.

In the third exemplary embodiment, there will be described optical reflection element 100A including, in addition to first swing portion 210 and second swing portion 220, third swing portion 230 and fourth swing portion 240.

Figure 6:
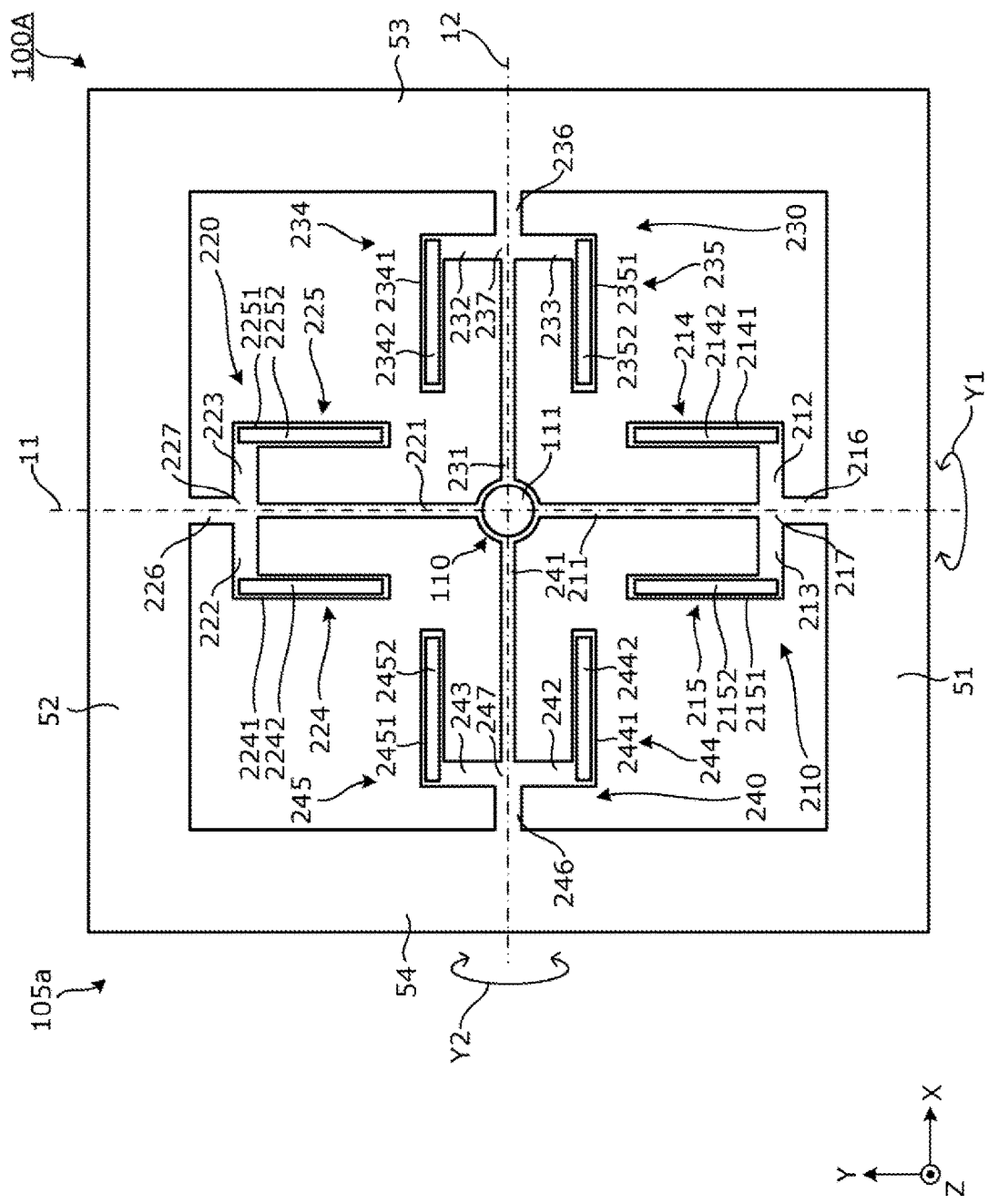
FIG. 6 is a plan view of an optical reflection element according to a third exemplary embodiment.

FIG. 6 is a plan view illustrating optical reflection element 100A according to the third exemplary embodiment. Specifically, FIG. 6 corresponds to FIG. 1A. As illustrated in FIG. 6, optical reflection element 100A includes base 105a having a substantially square shape, and there are provided, inside base 105a, first swing portion 210, second swing portion 220, third swing portion 230, and fourth swing portion 240.

Third swing portion 230 and fourth swing portion 240 are portions for swinging reflector 110, together with first swing portion 210 and second swing portion 220. Each of third swing portion 230 and fourth swing portion 240 is disposed at a respective one of positions sandwiching reflector 110 along second axis 12.

Third swing portion 230 and fourth swing portion 240 have the same basic configuration as first swing portion 210. For example, third swing portion 230 is disposed at a position obtained by rotating first swing portion 210 counterclockwise by 90 degrees with respect to the center point of optical reflection element 100A. On the other hand, fourth swing portion 240 is disposed at a position obtained by rotating first swing portion 210 clockwise by 90 degrees with respect to the center point of optical reflection element 100A.

Next, a specific structure of third swing portion 230 will be described. As described above, third swing portion 230 has the same basic configuration as first swing portion 210. Therefore, a correspondence relationship between portions of third swing portion 230 and their corresponding portions of first swing portion 210 will be mainly described.

Third swing portion 230 includes third connection portion 231, third vibration portion 232, fourth vibration portion 233, third drive portion 234, fourth drive portion 235, and fourth connection portion 236.

Third connection portion 231 is an example of a third connection portion, and is a portion corresponding to first connection portion 211 of first swing portion 210. Third connection portion 231 is disposed along second axis 12.

Third vibration portion 232 is an example of a third vibration portion, and is a portion corresponding to first vibration portion 212 of first swing portion 210. Fourth vibration portion 233 is an example of a fourth vibration portion, and is a portion corresponding to second vibration portion 213 of first swing portion 210. Third vibration portion 232 and fourth vibration portion 233 extend in the Y-axis direction. Third vibration portion 232 is disposed in the positive direction of the Y-axis with respect to second axis 12, and fourth vibration portion 233 is disposed in the negative direction of the Y-axis with respect to second axis 12. A base end of third vibration portion 232 and a base end of fourth vibration portion 233 are integrally coupled to each other by coupling portion 237.

Third drive portion 234 is an example of a third drive portion, and is a portion corresponding to first drive portion 214 of first swing portion 210. Fourth drive portion 235 is an example of a fourth drive portion, and is a portion corresponding to second drive portion 215 of first swing portion 210. Third drive portion 234 and fourth drive portion 235 extend along second axis 12. Third drive portion 234 is disposed in the positive direction of the Y-axis with respect to second axis 12, and fourth drive portion 235 is disposed in the negative direction of the Y-axis with respect to second axis 12.

Third drive portion 234 includes third drive main portion 2341 and third piezoelectric element 2342, which correspond to first drive main portion 2141 and first piezoelectric element 2142 of first drive portion 214. Fourth drive portion 235 includes fourth drive main portion 2351 and fourth piezoelectric element 2352, which correspond to second drive main portion 2151 and second piezoelectric element 2152 of second drive portion 215. Although not illustrated, third piezoelectric element 2342 and fourth piezoelectric element 2352 are electrically connected to drive circuit 22 of controller 20.

Fourth connection portion 236 is an example of a fourth connection portion, and is a portion corresponding to second connection portion 216 of first swing portion 210. Fourth connection portion 236 is disposed along second axis 12, a base end of fourth connection portion 236 is coupled to third side portion 53, and a tip end of fourth connection portion 236 is coupled to the base end of third vibration portion 232 and the base end of fourth vibration portion 233 via coupling portion 237.

Although not illustrated, third swing portion 230 is provided with: a first monitor element that detects distortion of third vibration portion 232; and a second monitor element that detects distortion of fourth vibration portion 233. The first monitor element and the second monitor element of third swing portion 230 are electrically connected to angle detection circuit 21 of controller 20.

Next, a specific structure of fourth swing portion 240 will be described. As described above, fourth swing portion 240 has the same basic configuration as first swing portion 210. Therefore, a correspondence relationship between portions of fourth swing portion 240 and their corresponding portions of first swing portion 210 will be mainly described.

Fourth swing portion 240 includes third connection portion 241, third vibration portion 242, fourth vibration portion 243, third drive portion 244, fourth drive portion 245, and fourth connection portion 246.

Third connection portion 241 is a portion corresponding to first connection portion 211 of first swing portion 210. Third connection portion 241 is disposed along second axis 12.

Third vibration portion 242 is a portion corresponding to first vibration portion 212 of first swing portion 210. Fourth vibration portion 243 is a portion corresponding to second vibration portion 213 of first swing portion 210. Third vibration portion 242 and fourth vibration portion 243 extend in the Y-axis direction. Third vibration portion 242 is disposed in the negative direction of the Y-axis with respect to second axis 12. Fourth vibration portion 243 is disposed in the positive direction of the Y-axis with respect to second axis 12. A base end of third vibration portion 242 and a base end of the fourth vibration portion 243 are integrally coupled to each other by connection portion 247.

Third drive portion 244 is a portion corresponding to first drive portion 214 of first swing portion 210. Fourth drive portion 245 is a portion corresponding to second drive portion 215 of first swing portion 210. Third drive portion 244 and fourth drive portion 245 extend along second axis 12. Third drive portion 244 is disposed in the negative direction of the Y-axis with respect to second axis 12, and fourth drive portion 245 is disposed in the positive direction of the Y-axis with respect to second axis 12.

Third drive portion 244 includes third drive main portion 2441 and third piezoelectric element 2442, which correspond to first drive main portion 2141 and first piezoelectric element 2142 of first drive portion 214. Fourth drive portion 245 includes fourth drive main portion 2451 and fourth piezoelectric element 2452, which correspond to second drive main portion 2151 and second piezoelectric element 2152 of second drive portion 215. Although not illustrated, third piezoelectric element 2442 and fourth piezoelectric element 2452 are electrically connected to drive circuit 22 of controller 20.

Fourth connection portion 246 is a portion corresponding to second connection portion 216 of first swing portion 210. Fourth connection portion 246 is disposed along second axis 12, a base end of fourth connection portion 246 is coupled to fourth side portion 54, and a tip end of fourth connection portion 246 is coupled to the base end of third vibration portion 242 and the base end of fourth vibration portion 243 via coupling portion 247.

Although not illustrated, fourth swing portion 240 is provided with: a first monitor element that detects distortion of third vibration portion 242; and a second monitor element that detects distortion of fourth vibration portion 243. The first monitor element and the second monitor element of fourth swing portion 240 are electrically connected to angle detection circuit 21 of controller 20.

(Operation)

Next, an operation of optical reflection element 100A will be described. Optical reflection element 100A operates on the basis of the control of controller 20. Controller 20 can perform a first mode for rotationally swinging reflector 110 about first axis 11 and a second mode for rotationally swinging reflector 110 about second axis 12.

(First Mode)

An operation in the first mode will be described. In the first mode, controller 20 applies first drive signal W1 to third piezoelectric element 2342 and fourth piezoelectric element 2352 of third swing portion 230, and applies second drive signal W2 to third piezoelectric element 2442 and fourth piezoelectric element 2452 of fourth swing portion 240. As a result, third drive portion 234 and fourth drive portion 235 of third swing portion 230 vibrate in the same phase as third connection portion 231 of third swing portion 230. On the other hand, third drive portion 244 and fourth drive portion 245 of fourth swing portion 240 vibrate in the same phase as third connection portion 241 of fourth swing portion 240. As a result, because third connection portions 231, 241 vibrate in a wavy manner, reflector 110 rotationally swings about first axis 11 (see arrow Y1 in FIG. 6).

At this time, controller 20 causes first drive portion 214 and second drive portion 215 of first swing portion 210 to vibrate in opposite phases, and causes first drive portion 224 and second drive portion 225 of second swing portion 220 to vibrate in opposite phases so that the swing of reflector 110 will be amplified. Specifically, controller 20 applies first drive signal W1 to first piezoelectric element 2142 of first swing portion 210 and second piezoelectric element 2252 of second swing portion 220, and applies second drive signal W2 to second piezoelectric element 2152 of first swing portion 210 and first piezoelectric element 2242 of second swing portion 220. As a result, because first connection portions 211, 221 are twisted about first axis 11, the rotational swing of reflector 110 about first axis 11 is amplified.

(Second Mode)

An operation in the second mode will be described. In the second mode, controller 20 applies first drive signal W1 to first piezoelectric element 2142 and second piezoelectric element 2152 of first swing portion 210, and applies second drive signal W2 to first piezoelectric element 2242 and second piezoelectric element 2252 of second swing portion 220. As a result, first drive portion 214 and second drive portion 215 of first swing portion 210 vibrate in the same phase as first connection portion 211 of first swing portion 210. On the other hand, first drive portion 224 and second drive portion 225 of second swing portion 220 vibrate in the same phase as first connection portion 221 of second swing portion 220. As a result, because first connection portions 211, 221 vibrate in a wavy manner, reflector 110 rotationally swings about second axis 12 (see arrow Y2 in FIG. 6).

At this time, controller 20 causes third drive portion 234 and fourth drive portion 235 of third swing portion 230 to vibrate in opposite phases, and causes third drive portion 244 and fourth drive portion 245 of fourth swing portion 240 to vibrate in opposite phases so that the swing of reflector 110 will be amplified. Specifically, controller 20 applies first drive signal W1 to third piezoelectric element 2342 of third swing portion 230 and the fourth piezoelectric element 2452 of fourth swing portion 240, and applies second drive signal W2 to fourth piezoelectric element 2352 of third swing portion 230 and the third piezoelectric element 2442 of fourth swing portion 240. As a result, because third connection portions 231, 241 are twisted about second axis 12, the rotational swing of reflector 110 about second axis 12 is amplified.

Advantageous Effects and Others

As described above, in the present exemplary embodiment, controller 20 causes first drive portion 214 and second drive portion 215 of first swing portion 210 to vibrate in the same phase, and causes first drive portion 224 and second drive portion 225 of second swing portion 220 to vibrate in the same phase but in the opposite phase to first swing portion 210. At that time, controller 20 causes third drive portion 234 and fourth drive portion 235 of third swing portion 230 to vibrate in opposite phases, and causes third drive portion 244 and fourth drive portion 245 of fourth swing portion 240 to vibrate in opposite phases so that the swing of reflector 110 will be amplified.

This operation makes it possible to amplify the rotational swing of reflector 110 in the second mode. Therefore, the deflection angle characteristic of reflector 110 can be improved in the second mode, and as a result, the performance of optical reflection element 100 is improved.

In the present exemplary embodiment, controller 20 causes third drive portion 234 and fourth drive portion 235 of third swing portion 230 to vibrate in the same phase, and causes third drive portion 244 and fourth drive portion 245 of fourth swing portion 240 to vibrate in the same phase but in the opposite phase to third swing portion 230. At that time, controller 20 causes first drive portion 214 and second drive portion 215 of first swing portion 210 to vibrate in opposite phases, and causes first drive portion 224 and second drive portion 225 of second swing portion 220 to vibrate in opposite phases so that the swing of reflector 110 will be amplified.

This operation makes it possible to amplify the rotational swing of reflector 110 in the first mode. Therefore, the deflection angle characteristic of reflector 110 can be improved in the first mode, and as a result, the performance of optical reflection element 100 is improved.

Fourth Exemplary Embodiment

Next, a fourth exemplary embodiment will be described. In the following description, the same portions as the portions in the above third exemplary embodiment are denoted by the same reference marks, and the description thereof may be omitted.

(First Mode)

An operation in a first mode will be described. In the first mode, controller 20 applies first drive signal W1 to third piezoelectric element 2342 and fourth piezoelectric element 2352 of third swing portion 230, and applies second drive signal W2 to third piezoelectric element 2442 and fourth piezoelectric element 2452 of fourth swing portion 240. As a result, third drive portion 234 and fourth drive portion 235 of third swing portion 230 vibrate in the same phase as third connection portion 231 of third swing portion 230. On the other hand, third drive portion 244 and fourth drive portion 245 of fourth swing portion 240 vibrate in the same phase as third connection portion 241 of fourth swing portion 240. As a result, because third connection portions 231, 241 vibrate in a wavy manner, reflector 110 rotationally swings about first axis 11 (see arrow Y1 in FIG. 6).

At this time, controller 20 stops voltage supply to first drive portion 214 and second drive portion 215 of first swing portion 210 and first drive portion 224 and second drive portion 225 of second swing portion 220.

(Second Mode)

An operation in a second mode will be described. In the second mode, controller 20 applies first drive signal W1 to first piezoelectric element 2142 and second piezoelectric element 2152 of first swing portion 210, and applies second drive signal W2 to first piezoelectric element 2242 and second piezoelectric element 2252 of second swing portion 220. As a result, first drive portion 214 and second drive portion 215 of first swing portion 210 vibrate in the same phase as first connection portion 211 of first swing portion 210. On the other hand, first drive portion 224 and second drive portion 225 of second swing portion 220 vibrate in the same phase as first connection portion 221 of second swing portion 220. As a result, because first connection portions 211, 221 vibrate in a wavy manner, reflector 110 rotationally swings about second axis 12 (see arrow Y2 in FIG. 6).

At this time, controller 20 stops voltage supply to third drive portion 234 and fourth drive portion 235 of third swing portion 230 and third drive portion 244 and fourth drive portion 245 of fourth swing portion 240.

Advantageous Effects and Others

As described above, with the present exemplary embodiment, controller 20 can cause first drive portion 214 and second drive portion 215 of first swing portion 210 to vibrate in the same phase, and can cause first drive portion 224 and second drive portion 225 of second swing portion 220 vibrate in the same phase but in the opposite phase to first swing portion 210. At that time, voltage supply to third drive portion 234 and fourth drive portion 235 of third swing portion 230 and voltage supply to third drive portion 244 and fourth drive portion 245 of fourth swing portion 240 are stopped.

Further, controller 20 can cause third drive portion 234 and fourth drive portion 235 of third swing portion 230 to vibrate in the same phase, and can cause third drive portion 244 and fourth drive portion 245 of fourth swing portion 240 to vibrate in the same phase but in the opposite phase to third swing portion 230. At that time, voltage supply to first drive portion 214 and second drive portion 215 of first swing portion 210 and voltage supply to first drive portion 214 and second drive portion 215 of second swing portion 220 are stopped.

With this operation, in the first mode, voltage is not suppled to the drive portions of each of first swing portion 210 and second swing portion 220; and in the second mode, voltage is not supplied to the drive portions of each of third swing portion 230 and fourth swing portion 240. Therefore, it is possible to smoothly switch between the first mode and the second mode.

Fifth Exemplary Embodiment

Next, a fifth exemplary embodiment will be described. In the following description, the same portions as the portions in the above third exemplary embodiment are denoted by the same reference marks, and the description thereof may be omitted.

In the above-described third exemplary embodiment, a case has been described in which the following two modes are performed: the first mode in which reflector 110 is rotationally swung about first axis 11; and the second mode in which reflector 110 is rotationally swung about second axis 12. In the present fifth exemplary embodiment, there will be described a case where reflector 110 is rotationally swung about an axis different from first axis 11 and second axis 12.

Figure 7:
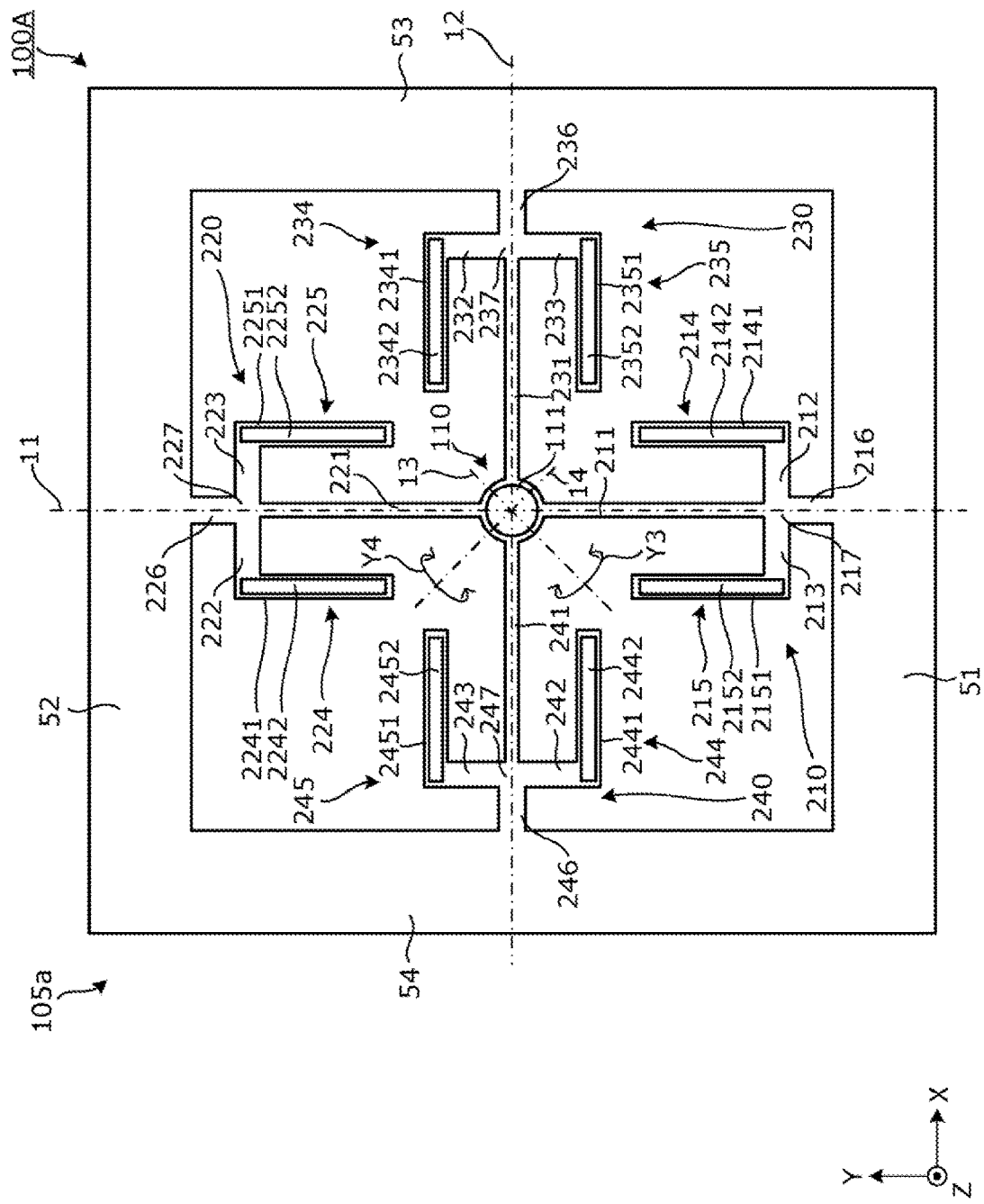
FIG. 7 is a plan view illustrating a rotational axis of an optical reflection element according to a fifth exemplary embodiment.

FIG. 7 is a plan view illustrating rotational axes of optical reflection element 100A according to the fifth exemplary embodiment. Third axis 13 is an axis line inclined clockwise by 45 degrees with respect to first axis 11 with the center point of optical reflection element 100A as a reference. Fourth axis 14 is an axis line inclined counterclockwise by 45 degrees with respect to second axis 12 with the center point of optical reflection element 100A as a reference. Controller 20 can perform a third mode for rotationally swinging reflector 110 about third axis 13 and a fourth mode for rotationally swinging reflector 110 about fourth axis 14.

(Third Mode)

An operation in the third mode will be described. In the third mode, controller 20 causes first drive portion 214 and second drive portion 215 of first swing portion 210 to vibrate in the same phase, and causes first drive portion 224 and second drive portion 225 of second swing portion 220 to vibrate in the same phase but in the opposite phase to first swing portion 210. At that time, controller 20 causes third drive portion 234 and fourth drive portion 235 of third swing portion 230 to vibrate in the same phase as first swing portion 210, and causes third drive portion 244 and fourth drive portion 245 of fourth swing portion 240 to vibrate in the same phases as second swing portion 220.

Specifically, controller 20 applies first drive signal W1 to the piezoelectric elements of first swing portion 210 and third swing portion 230, and applies second drive signal W2 to the piezoelectric elements of second swing portion 220 and fourth swing portion 240. As a result, the drive portions of first swing portion 210 and third swing portion 230 vibrate in the same phase. Specifically, first connection portion 211 of first swing portion 210 and third connection portion 231 of third swing portion 230 repeat, at the same timing, protruding in the positive direction of the Z-axis and protruding in the negative direction of the Z-axis.

On the other hand, the drive portions of second swing portion 220 and fourth swing portion 240 vibrate in the same phase but vibrate in the opposite phase to the drive portions of first swing portion 210 and third swing portion 230. Specifically, first connection portion 221 of second swing portion 220 and third connection portion 241 of fourth swing portion 240 repeat, at the same timing, protruding in the positive direction of the Z-axis and protruding in the negative direction of the Z-axis. This repeated operation is performed in the opposite phase to the repeated operation of first connection portion 211 of first swing portion 210 and third connection portion 231 of third swing portion 230. These repeated operations cause reflector 110 to rotationally swing about third axis 13 (see arrow Y3 in FIG. 7).

(Fourth Mode)

An operation in the fourth mode will be described. In the fourth mode, controller 20 causes first drive portion 214 and second drive portion 215 of first swing portion 210 to vibrate in the same phase, and at the same time, causes first drive portion 224 and second drive portion 225 of second swing portion 220 to vibrate in the same phase but in the opposite phase to first swing portion 210. At this time, controller 20 causes third drive portion 234 and fourth drive portion 235 of third swing portion 230 to vibrate in the same phase as second swing portion 220, and causes third drive portion 244 and fourth drive portion 245 of fourth swing portion 240 to vibrate in the same phase as first swing portion 210.

Specifically, controller 20 applies first drive signal W1 to the piezoelectric elements of first swing portion 210 and fourth swing portion 240, and applies second drive signal W2 to the piezoelectric elements of second swing portion 220 and third swing portion 230. As a result, the drive portions of first swing portion 210 and fourth swing portion 240 vibrate in the same phase. Specifically, first connection portion 211 of first swing portion 210 and third connection portion 241 of fourth swing portion 240 repeat, at the same timing, protruding in the positive direction of the Z-axis and protruding in the negative direction of the Z-axis.

On the other hand, the drive portions of second swing portion 220 and third swing portion 230 vibrate in the same phase but vibrate in the opposite phase to the drive portions of first swing portion 210 and fourth swing portion 240. Specifically, first connection portion 221 of second swing portion 220 and third connection portion 231 of third swing portion 230 repeat, at the same timing, protruding in the positive direction of the Z-axis and protruding in the negative direction of the Z-axis. This repeated operation is performed in the opposite phase to the repeated operation of first connection portion 211 of first swing portion 210 and third connection portion 241 of fourth swing portion 240. These repeated operations cause reflector 110 to rotationally swing about fourth axis 14 (see arrow Y4 in FIG. 7).

Advantageous Effects and Others

As described above, in the present exemplary embodiment, controller 20 causes first drive portion 214 and second drive portion 215 of first swing portion 210 to vibrate in the same phase, and causes first drive portion 224 and second drive portion 225 of second swing portion 220 to vibrate in the same phase but in the opposite phase to first swing portion 210. At that time, the third mode and the fourth mode are switched. The third mode is the case where third drive portion 234 and fourth drive portion 235 of third swing portion 230 are vibrated in the same phase as first swing portion 210 and, at the same time, third drive portion 244 and fourth drive portion 245 of fourth swing portion 240 are vibrated in the same phase as second swing portion 220. The fourth mode is the case where third drive portion 234 and fourth drive portion 235 of third swing portion 230 are vibrated in the same phase as second swing portion 220 and, at the same time, third drive portion 244 and fourth drive portion 245 of fourth swing portion 240 are vibrated in the same phase as first swing portion 210.

By the above modes, it is possible to rotationally swing reflector 110 about third axis 13 and to rotationally swing reflector 110 about fourth axis 14. Therefore, the swing range of reflector 110 can be expanded, and the performance of optical reflection element 100A can be improved.

Optical reflection element 100A described in the third to fifth exemplary embodiments includes first axis 11, second axis 12, reflector 110, base 105a, first swing portion 210, second swing portion 220, third swing portion 230, and fourth swing portion 240.

Second axis 12 intersects first axis 11.

Reflector 110 reflects light.

Each of first swing portion 210 and second swing portion 220 is disposed at a respective one of positions sandwiching reflector 110 along first axis 11. Each of first swing portion 210 and second swing portion 220 swings reflector 110.

Each of third swing portion 230 and fourth swing portion 240 is disposed at a respective one of positions sandwiching reflector 110 along second axis 12. Each of third swing portion 230 and fourth swing portion 240 swings reflector 110.

First swing portion 210 and second swing portion 220 are disposed along first axis 11.

First swing portion 210 includes first connection portion 211, first vibration portion 212, second vibration portion 213, first drive portion 214, second drive portion 215, and second connection portion 216.

A tip end of first connection portion 211 is coupled to reflector 110.

First vibration portion 212 extends in a direction intersecting first axis 11. First vibration portion 212 is coupled to a base end of first connection portion 211.

Second vibration portion 213 extends in a direction intersecting first axis 11 and on the opposite side of first vibration portion 212 with respect to first axis 11. Second vibration portion 213 is coupled to the base end of first connection portion 211.

First drive portion 214 extends along first axis 11. A base end of first drive portion 214 is coupled to a tip end of first vibration portion 212. First drive portion 214 causes, via first vibration portion 212, first connection portion 211 to operate.

Second drive portion 215 extends along first axis 11. A base end of second drive portion 215 is coupled to a tip end of second vibration portion 213. Second drive portion 215 causes, via second vibration portion 213, first connection portion 211 to operate.

Second connection portion 216 connects the first vibration portion 212 and second vibration portion 213 to base 105a in a vibratory manner.

Second swing portion 220 includes first connection portion 221, first vibration portion 222, second vibration portion 223, first drive portion 224, second drive portion 225, and second connection portion 226.

A tip end of first connection portion 221 is coupled to reflector 110.

First vibration portion 222 extends in a direction intersecting first axis 11. First vibration portion 222 is coupled to a base end of first connection portion 221.

Second vibration portion 223 extends in a direction intersecting first axis 11 and on the opposite side of first vibration portion 222 with respect to first axis 11. Second vibration portion 223 is coupled to the base end of first connection portion 221.

First drive portion 224 extends along first axis 11. A base end of first drive portion 224 is coupled to a tip end of first vibration portion 222. First drive portion 224 causes, via first vibration portion 222, first connection portion 221 to operate.

Second drive portion 225 extends along first axis 11. A base end of second drive portion 225 is coupled to a tip end of second vibration portion 223. Second drive portion 225 causes, via second vibration portion 223, first connection portion 221 to operate.

Second connection portion 226 connects first vibration portion 222 and second vibration portion 223 to base 105a in a vibratory manner.

Each of third swing portion 230 and fourth swing portion 240 is disposed along second axis 12.

Third swing portion 230 includes third connection portion 231, third vibration portion 232, fourth vibration portion 233, third drive portion 234, fourth drive portion 235, and fourth connection portion 236.

A tip end of third connection portion 231 is coupled to reflector 110.

Third vibration portion 232 extends in a direction intersecting second axis 12. Third vibration portion 232 is coupled to a base end of third connection portion 231.

Fourth vibration portion 233 extends in a direction intersecting second axis 12 and on the opposite side of third vibration portion 232 with respect to second axis 12. Fourth vibration portion 233 is coupled to the base end of third connection portion 231.

Third drive portion 234 extends along second axis 12. A base end of third drive portion 234 is coupled to a tip end of third vibration portion 232. Third drive portion 234 causes, via third vibration portion 232, third connection portion 231 to operate.

Fourth drive portion 235 extends along second axis 12. A base end of fourth drive portion 235 is coupled to a tip end of fourth vibration portion 233. Fourth drive portion 235 causes, via fourth vibration portion 233, third connection portion 231 to operate.

Fourth connection portion 236 connects third vibration portion 232 and fourth vibration portion 233 to base 105a in a vibratory manner.

Fourth swing portion 240 includes third connection portion 241, third vibration portion 242, fourth vibration portion 243, third drive portion 244, fourth drive portion 245, and fourth connection portion 246.

A tip end of third connection portion 241 is coupled to reflector 110.

Third vibration portion 242 extends in a direction intersecting second axis 12. Third vibration portion 242 is coupled to a base end of third connection portion 241.

Fourth vibration portion 243 extends in a direction intersecting second axis 12 and on the opposite side of third vibration portion 242 with respect to second axis 12. Fourth vibration portion 243 is coupled to the base end of third connection portion 241.

Third drive portion 244 extends along second axis 12. A base end of third drive portion 244 is coupled to a tip end of third vibration portion 242. Third drive portion 244 causes, via third vibration portion 242, third connection portion 241 to operate.

Fourth drive portion 245 extends along second axis 12. A base end of fourth drive portion 245 is coupled to a tip end of fourth vibration portion 243. Fourth drive portion 245 causes, via fourth vibration portion 243, third connection portion 241 to operate.

Fourth connection portion 246 connects third vibration portion 242 and fourth vibration portion 243 to base 105a in a vibratory manner.

Since optical reflection element 100A is configured as described above, it is possible to perform a plurality of control methods described in, for example, the third to fifth exemplary embodiments. Since the degree of freedom in swing control of reflector 110 is improved as described above, the performance of optical reflection element 100A can be improved.

In the third to fifth exemplary embodiments, controller 20 may perform control corresponding to the second exemplary embodiment. Specifically, in the case where controller 20 causes first drive portion 214 and second drive portion 215 of first swing portion 210 to vibrate in the same phase and, at the same time, causes first drive portion 224 and second drive portion 225 of second swing portion 220 to vibrate in the same phase but in the opposite phase to first swing portion 210, controller 20 performs the following control. Controller 20 causes first drive portion 214 and second drive portion 215 of first swing portion 210 to vibrate in the same phase so as to cause first drive portion 214 and second drive portion 215 of first swing portion 210 to vibrate in the opposite phase to first connection portion 211 of first swing portion 210. At the same time, controller 20 causes first drive portion 224 and second drive portion 225 of second swing portion 220 to vibrate in the same phase so as to cause first drive portion 224 and second drive portion 225 of second swing portion 220 to vibrate in the opposite phase to first connection portion 221 of second swing portion 220.

In this case, since the displacement direction of first drive portion 214 and second drive portion 215 and the displacement direction of first drive portion 224 and second drive portions 225 are respectively opposite to the displace direction of the first connection portion 211 and the displacement direction of first connection portion 221, a vibration confinement effect can be generated in each of first swing portion 210 and second swing portion 220. Therefore, the deflection angle characteristic of reflector 110 can be improved, and as a result, the performance of optical reflection element 100 is improved.

Further, in the case where controller 20 causes third drive portion 234 and fourth drive portion 235 of third swing portion 230 to vibrate in the same phase, and causes third drive portion 244 and fourth drive portion 245 of fourth swing portion 240 to vibrate in the same phase but in the opposite phase to third swing portion 230, controller 20 performs the following control. Controller 20 causes third drive portion 234 and fourth drive portion 235 of third swing portion 230 to vibrate in the same phase so as to cause third drive portion 234 and fourth drive portion 235 of third swing portion 230 to vibrate in the opposite phase to third connection portion 231 of third swing portion 230. At the same time, controller 20 causes third drive portion 244 and fourth drive portion 245 of fourth swing portion 240 to vibrate in the same phase so as to cause third drive portion 244 and fourth drive portion 245 of fourth swing portion 240 to vibrate in the opposite phase to third connection portion 241 of fourth swing portion 240.

In this case, since the displacement direction of third drive portion 234 and fourth drive portion 235 and the displacement direction of third drive portion 244 and fourth drive portion 245 are respectively opposite to the displace direction of third connection portion 231 and the displacement direction of third connection portion 241, a vibration confinement effect can be generated in each of third swing portion 230 and fourth swing portion 240. Therefore, the deflection angle characteristic of reflector 110 can be improved, and as a result, the performance of optical reflection element 100A is improved.

Sixth Exemplary Embodiment

Next, a sixth exemplary embodiment will be described. In the following description, the same portions as the portions in the above first exemplary embodiment are denoted by the same reference marks, and the description thereof may be omitted.

The first exemplary embodiment describes as an example reflector 110 having a disk shape, but the present sixth exemplary embodiment describes reflector 110*b* having a higher stress relaxation effect than reflector 110 having a disk shape.

Figure 8:
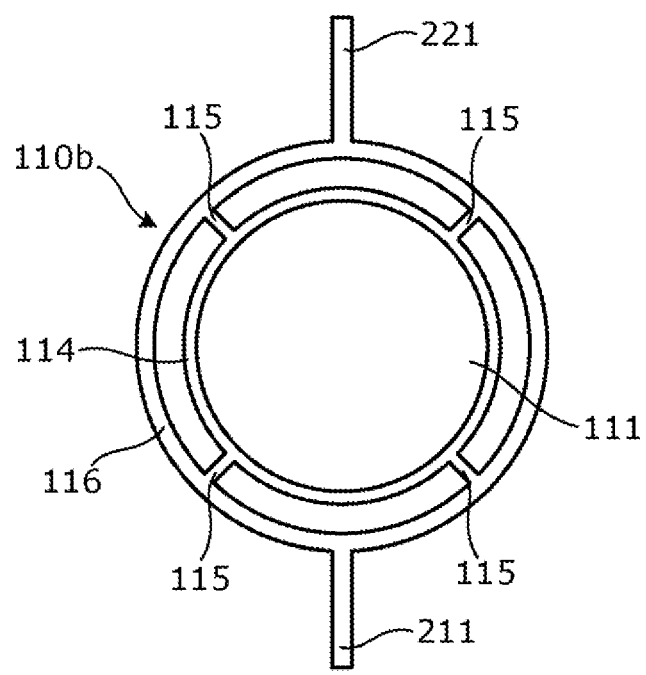
FIG. 8 is a plan view illustrating a reflector according to a sixth exemplary embodiment

FIG. 8 is a plan view illustrating reflector 110*b* according to the sixth exemplary embodiment. As illustrated in FIG. 8, reflector 110*b* includes reflector main body 114, a plurality of column portions 115, and frame 116.

Reflector main body 114 has a disk shape, and reflection portion 111 is provided on the surface of reflection main portion 114. The plurality of column portions 115 are arranged at predetermined intervals in the circumferential direction, from a peripheral edge of reflector main body 114. Each of column portions 115 protrudes outward from an outer peripheral surface of reflector main body 114. Frame 116 has an annular shape and is disposed to be concentric with reflector main body 114. Frame 116 is coupled to tip ends of the plurality of column portions 115. To the outer peripheral surface of frame 116, there are connected a tip end of first connection portion 211 of first swing portion 210 and a tip end of first connection portion 221 of second swing portion 220. Therefore, torsion and vibration from first connection portions 211, 221 are transmitted to reflector main body 114 via frame 116 and the plurality of column portions 115. That is, since torsion and vibration from the first connection portions 211, 221 are not directly transmitted to reflector main body 114, a stress applied to reflector main body 114 is alleviated.

Advantageous Effects and Others

As described above, according to the present exemplary embodiment, reflector 110*b* includes reflector main body 114, the plurality of column portions 115 protruding in the circumferential direction from the peripheral edge of reflector main body 114 at predetermined intervals, and frame 116 coupled to the plurality of column portions 115. The tip ends of first connection portions 211, 221 are coupled to frame 116.

This arrangement alleviates the stress applied to reflector main body 114, so that the amount of warp of reflector main body 114, that is, the amount of warp of reflection portion 111 is reduced.

Note that it is possible to apply reflector 110*b* according to the present sixth exemplary embodiment to optical reflection element 100A described as an example in the third exemplary embodiment. In this case, the tip ends of the first connection portions of the swing portions may be connected to frame 116 of reflector 110*b*.

Others

Note that the present disclosure is not limited to the above exemplary embodiments. For example, another exemplary embodiment implemented by arbitrarily combining the constituent elements described in the present specification or by excluding some of the constituent elements may be an exemplary embodiment of the present disclosure. The present disclosure also includes variations obtained by making various modifications conceivable by those skilled in the art without departing from the spirit of the present disclosure, in other words, without departing from the meaning indicated by the wording described in the claims.

The present disclosure can be used in, for example, a small-sized display device, a small-sized projector, an in-vehicle head-up display device, an electrophotographic copying machine, a laser printer, an optical scanner, and an optical device such as an optical radar.

What is claimed is:

1. A light control system comprising:
an optical reflection element that reflects and reciprocally moves light; and
a controller that controls the optical reflection element, the optical reflection element including:
  a base;
  a reflector that reflects the light; and
  a first swing portion and a second swing portion each of which is disposed along a first axis and at a respective one of positions sandwiching the reflector and swings the reflector,
each of the first swing portion and the second swing portion including:
  a first connection portion that is disposed along the first axis and has a tip end coupled to the reflector;
  a first vibration portion that extends along a direction intersecting the first axis and is coupled to a base end of the first connection portion;
  a second vibration portion that extends in a direction intersecting the first axis and on an opposite side of the first vibration portion with respect to the first axis and is coupled to the base end of the first connection portion;
  a first drive portion that extends along the first axis, has a base end coupled to a tip end of the first vibration portion, and causes, via the first vibration portion, the first connection portion to operate;
  a second drive portion that extends along the first axis, has a base end coupled to a tip end of the second vibration portion, and causes, via the second vibration portion, the first connection portion to operate; and
  a second connection portion that connects the first vibration portion and the second vibration portion to the base in a vibratory manner,
wherein when the controller causes the first drive portion and the second drive portion of the first swing portion to vibrate in a same phase, the controller causes the first drive portion and the second drive portion of the second swing portion to vibrate in a same phase that is an opposite phase to the same phase of the first swing portion.

2. The light control system according to claim 1, wherein when the controller causes the first drive portion and the second drive portion of first swing portion to vibrate in a same phase to cause the first drive portion and the second drive portion of the first swing portion to vibrate in an opposite phase to the first connection portion of the first swing portion, the controller causes the first drive portion and the second drive portion of the second swing portion to vibrate in a same phase to cause the first drive portion and the second drive portion of the second swing portion to vibrate in an opposite phase to the first connection portion of the second swing portion.

3. The light control system according to claim 1, wherein the optical reflection element includes:
a third swing portion and a fourth swing portion each of which is disposed along a second axis intersecting the first axis and at a respective one of positions sandwiching the reflector and swings the reflector, each of the third swing portion and the fourth swing portion including:
  a third connection portion that is disposed along the second axis and has a tip end coupled to the reflector;

a third vibration portion that extends along a direction intersecting the second axis and is coupled to a base end of the third connection portion;

a fourth vibration portion that extends in a direction intersecting the second axis and on an opposite side of the third vibration portion with respect to the second axis and is coupled to the base end of the third connection portion;

a third drive portion that extends along the second axis, has a base end coupled to a tip end of the third vibration portion, and causes, via the third vibration portion, the third connection portion to operate;

a fourth drive portion that extends along the second axis, has a base end coupled to a tip end of the fourth vibration portion, and causes, via the fourth vibration portion, the third connection portion to operate; and a fourth connection portion that connects the third vibration portion and the fourth vibration portion to the base in a vibratory manner.

4. The light control system according to claim 3, wherein when the controller causes the first drive portion and the second drive portion of the first swing portion to vibrate in a same phase and causes the first drive portion and the second drive portion of the second swing portion to vibrate in a same phase but in an opposite phase to the first swing portion, the controller causes the third drive portion and the fourth drive portion of the third swing portion to vibrate in opposite phases and causes the third drive portion and the fourth drive portion of the fourth swing portion to vibrate in opposite phases to cause swing of the reflector to be amplified.

5. The light control system according to claim 4, wherein when the controller causes the third drive portion and the fourth drive portion of the third swing portion to vibrate in a same phase and causes the third drive portion and the fourth drive portion of the fourth swing portion to vibrate in a same phase but in an opposite phase to the third swing portion, the controller causes the first drive portion and the second drive portion of the first swing portion to vibrate in opposite phases and causes the first drive portion and the second drive portion of the second swing portion to vibrate in opposite phases to cause the swing of the reflector to be amplified.

6. The light control system according to claim 3, wherein when the controller causes the first drive portion and the second drive portion of the first swing portion to vibrate in a same phase and causes the first drive portion and the second drive portion of the second swing portion to vibrate in a same phase but in an opposite phase to the first swing portion, the controller stops voltage supply to the third drive portion and the fourth drive portion of the third swing portion and to the third drive portion and the fourth drive portion of the fourth swing portion, and when the controller causes the third drive portion and the fourth drive portion of the third swing portion to vibrate in a same phase and causes the third drive portion and the fourth drive portion of the fourth swing portion to vibrate in a same phase but in an opposite phase to the third swing portion, the controller stops voltage supply to the first drive portion and the second drive portion of the first swing portion and to the first drive portion and the second drive portion of the second swing portion.

7. The light control system according to claim 3, wherein when the controller causes the first drive portion and the second drive portion of the first swing portion to vibrate in a same phase and causes the first drive portion and the second drive portion of the second swing portion to vibrate in a same phase but in an opposite phase to the first swing portion, the controller switches between:

a case where the controller causes the third drive portion and the fourth drive portion of the third swing portion to vibrate in a same phase as the first swing portion and causes the third drive portion and the fourth drive portion of the fourth swing portion to vibrate in a same phase as the second swing portion; and a case where the controller causes the third drive portion and the fourth drive portion of the third swing portion to vibrate in a same phase as the second swing portion and causes the third drive portion and the fourth drive portion of the fourth swing portion to vibrate in a same phase as the first swing portion.

8. The light control system according to claim 4, wherein when the controller causes the first drive portion and the second drive portion of the first swing portion to vibrate in a same phase and causes the first drive portion and the second drive portion of the second swing portion to vibrate in a same phase but in an opposite phase to the first swing portion, the controller causes the first drive portion and the second drive portion of the first swing portion to vibrate in a same phase to cause the first drive portion and the second drive portion of the first swing portion to vibrate in an opposite phase to the first connection portion of the first swing portion and causes the first drive portion and the second drive portion of the second swing portion to vibrate in a same phase to cause the first drive portion and the second drive portion of the second swing portion to vibrate in an opposite phase to the first connection portion of the second swing portion, and when the controller causes the third drive portion and the fourth drive portion of the third swing portion to vibrate in a same phase and causes the third drive portion and the fourth drive portion of the fourth swing portion to vibrate in a same phase but in an opposite phase to the third swing portion, the controller causes the third drive portion and the fourth drive portion of the third swing portion to vibrate in a same phase to cause the third drive portion and the fourth drive portion of the third swing portion to vibrate in an opposite phase to the third connection portion of the third swing portion and causes the third drive portion and the fourth drive portion of the fourth swing portion to vibrate in a same phase to cause the third drive portion and the fourth drive portion of the fourth swing portion to vibrate in an opposite phase to the third connection portion of the fourth swing portion.

9. The light control system according to claim 1, wherein the reflector includes:

a reflector main body;

a plurality of column portions protruding from a peripheral edge of the reflector main body, in a circumferential direction, and at predetermined intervals; and a frame body coupled to the plurality of column portions, wherein a tip end of each of the first connection portions is coupled to the frame body.

10. An optical reflection element comprising:
a base;
a reflector that reflects light;
a first swing portion and a second swing portion each of which is disposed along a first axis and at a respective one of positions sandwiching the reflector and swings the reflector; and
a third swing portion and a fourth swing portion each of which is disposed along a second axis intersecting the first axis and at a respective one of positions sandwiching the reflector and swings the reflector,
wherein each of the first swing portion and the second swing portion includes:
  a first connection portion that is disposed along the first axis and has a tip end coupled to the reflector;
  a first vibration portion that extends along a direction intersecting the first axis and is coupled to a base end of the first connection portion;
  a second vibration portion that extends in a direction intersecting the first axis and on an opposite side of the first vibration portion with respect to the first axis and is coupled to the base end of the first connection portion;
  a first drive portion that extends along the first axis, has a base end coupled to a tip end of the first vibration portion, and causes, via the first vibration portion, the first connection portion to operate;
  a second drive portion that extends along the first axis, has a base end coupled to a tip end of the second vibration portion, and causes, via the second vibration portion, the first connection portion to operate; and
  a second connection portion that connects the first vibration portion and the second vibration portion to the base in a vibratory manner, and
each of the third swing portion and the fourth swing portion includes:
  a third connection portion that is disposed along the second axis and has a tip end coupled to the reflector;
  a third vibration portion that extends along a direction intersecting the second axis and is coupled to a base end of the third connection portion;
  a fourth vibration portion that extends in a direction intersecting the second axis and on an opposite side of the third vibration portion with respect to the second axis and is coupled to the base end of the third connection portion;
  a third drive portion that extends along the second axis, has a base end coupled to a tip end of the third vibration portion, and causes, via the third vibration portion, the third connection portion to operate;
  a fourth drive portion that extends along the second axis, has a base end coupled to a tip end of the fourth vibration portion, and causes, via the fourth vibration portion, the third connection portion to operate; and
  a fourth connection portion that connects the third vibration portion and the fourth vibration portion to the base in a vibratory manner.

* * * * *